United States Patent [19]
Matsuo et al.

[11] Patent Number: 5,701,449
[45] Date of Patent: *Dec. 23, 1997

[54] DATA PROCESSOR

[75] Inventors: Masahito Matsuo; Toyohiko Yoshida, both of Itami, Japan

[73] Assignee: Mitsubishi Denki Kabushiki Kaisha, Tokyo, Japan

[*] Notice: The term of this patent shall not extend beyond the expiration date of Pat. No. 5,526,498.

[21] Appl. No.: 657,710

[22] Filed: May 30, 1996

Related U.S. Application Data

[63] Continuation of Ser. No. 181,353, Jan. 13, 1994, Pat. No. 5,526,498, which is a continuation of Ser. No. 953,041, Sep. 29, 1992, abandoned, which is a division of Ser. No. 317,253, Feb. 28, 1989, Pat. No. 5,193,205.

[30] Foreign Application Priority Data

| Mar. 1, 1988 | [JP] | Japan | 63-49093 |
| Apr. 7, 1988 | [JP] | Japan | 63-86704 |

[51] Int. Cl.⁶ .................... G06F 9/38; G06F 9/40; G06F 9/42
[52] U.S. Cl. .................. 395/586; 395/590; 395/584; 395/800
[58] Field of Search .................. 395/800, 572, 395/584, 586, 590

[56] References Cited

U.S. PATENT DOCUMENTS

| 4,315,313 | 2/1982 | Armstrong et al. | 395/103.21 |
| 4,394,729 | 7/1983 | Armstrong | 395/590 |
| 4,399,507 | 8/1983 | Cosgrove et al. | 395/395 |
| 4,546,431 | 10/1985 | Horvath | 395/590 |
| 4,974,158 | 11/1990 | Watanabe et al. | 395/375 |
| 5,526,498 | 6/1996 | Matsuo et al. | 395/325 |

OTHER PUBLICATIONS

Lee, et al., "Branch Prediction Strategies and Branch Target Buffer Design," Computer, (Jan., 1984), pp.6–9.

Primary Examiner—Larry D. Donaghue
Attorney, Agent, or Firm—Philip H. Albert; Townsend and Townsend and Crew LLP

[57] ABSTRACT

A data processor in accordance with the present invention makes it possible to perform pre-branch processing with respect to a return address in the initial stage of pipeline processing also on a subroutine return instruction, and therefore by providing a stack memory (PC stack) dedicated to a program counter (PC) for storing only return addresses of the subroutine return instruction, in executing a subroutine call instruction in an execution stage of a pipeline processing mechanism, the return address from the subroutine is pushed to the PC stack, and the pre-branch processing is performed to the address popped from the PC stack in decoding the subroutine return instruction in an instruction decoding stage.

3 Claims, 12 Drawing Sheets

DATA PROCESSOR

This application is a continuation of U.S. application Ser. No. 08/181,353, filed Jan. 13, 1994, U.S. Pat. No. 5,526,498, which is a continuation of U.S. application Ser. No. 07/953,041, filed Sep. 29, 1992 (now abandoned), which is a divisional of U.S. application Ser. No. 07/317,253, filed Feb. 28, 1989, now issued U.S. Pat. No. 5,193,205.

BACKGROUND OF THE INVENTION

1. Field of the Invention

The present invention relates to a data processor having a pipeline processing mechanism, and to be further detailed, relates to a data processor realizing an advanced processing ability by means of a sophisticated pipeline processing mechanism. To be further specifically, the present invention relates to a data processor capable of pre-branch processing to a return address in the initial stage of pipeline processing on a subroutine return instruction.

2. Description of the Prior Art

FIG. 1 is a schematic diagram showing a functional configuration of a typical pipeline processing mechanism.

In FIG. 1, numeral 1 designates an instruction fetch (IF) stage, numeral 2 designates an instruction decoding (D) stage, numeral 3 designates an address calculation (A) stage, numeral 4 designates an operand fetch (F) stage, numeral 5 designates an execution (E) stage and numeral 8 designates an operand writing (W) stage.

Next, description is made on operation. A data processor as shown in FIG. 1 is configurated with six pipeline stages of the instruction fetch stage 1 fetching of an instruction data, the instruction decoding stage 2 decoding the instruction data, the address calculation stage 3 performing address calculation of an operand and the like, the operand fetch stage 4 fetching operand data, the execution stage 5 performing processing of data, and the operand writing stage writing of the operand data, and the respective stages can process different instructions at the same time. However, where a conflict takes place on an operand or memory access, a lower-priority stage suspends processing until the conflict is eliminated.

As described above, in the pipelined processor, processing is divided into a plurality of stages according to the flow of data processing, and each stage is operated simultaneously, and thereby the average processing time required for one instruction is shortened and the performance as a whole is improved.

However, in the data processor pipelined in such a manner, where an instruction disturbing the flow of an instruction such as a branch instruction has been executed in the execution stage 5, all of processings having been performed in the preceding stages are canceled, and an instruction to be executed next is fetched anew.

Thus, when an instruction disturbing the pipeline processing is executed, the overhead of pipeline processing is increased and the processing speed of the data processor is not increased. To improve the performance of the data processor, various ideas have been practiced to curtail the overhead on executing an instruction such as a unconditional branch instruction or a conditional branch instruction.

For example, using a so-called branch target buffer storing the address of branch instruction and the branch target address in combination, the flow of instructions is predicted in the instruction fetch stage (Refer to J. K. F. Lee and A. J. Smith, "Branch Prediction Strategies and Branch Target Buffer Design", IEEE COMPUTER Vol. 17. No.1, January 1984, pp.6–22.).

As described above, the curtailment of the overhead at branch instruction execution is made by predicting the flow of processing in the initial stage of the pipeline processing and passing an instruction predicted to be executed next through the pipeline (hereinafter referred to as pre-branch processing). However, the prediction of the processing flow of the return instruction from the subroutine has been difficult because of dependence of a return address from a subroutine upon an address of the corresponding subroutine call instruction.

In the conventional data processor, as described above, the return address from the subroutine depends upon the address of the corresponding subroutine call instruction in executing the return instruction from the subroutine, and therefore no effective means for predicting the flow of processing has been available.

SUMMARY OF THE INVENTION

The present invention has been achieved to solve the problem as described above, and the principal object thereof is to provide a data processor capable of exerting a high processing ability by making it possible to perform the pre-branch processing to the return address in the initial stage of the pipeline processing also on the subroutine return instruction.

The data processor in accordance with the present invention comprises a stack memory dedicated to a program counter (PC) (hereinafter referred to as PC stack) for storing only the return address of the subroutine return instruction.

By such a configuration, in the data processor of the present invention, the return address from the subroutine is pushed to the PC stack in executing the subroutine call instruction in the execution stage of the pipeline processing mechanism, and the pre-branch processing is performed to the address which is popped from the PC stack in decoding the subroutine return instruction in the instruction decoding stage.

The above and further objects and features of the invention will more fully be apparent from the following detailed description with accompanying drawings.

DESCRIPTION OF THE PREFERRED EMBODIMENT (1)"Pipeline Processing Mechanism"

Figure 1:
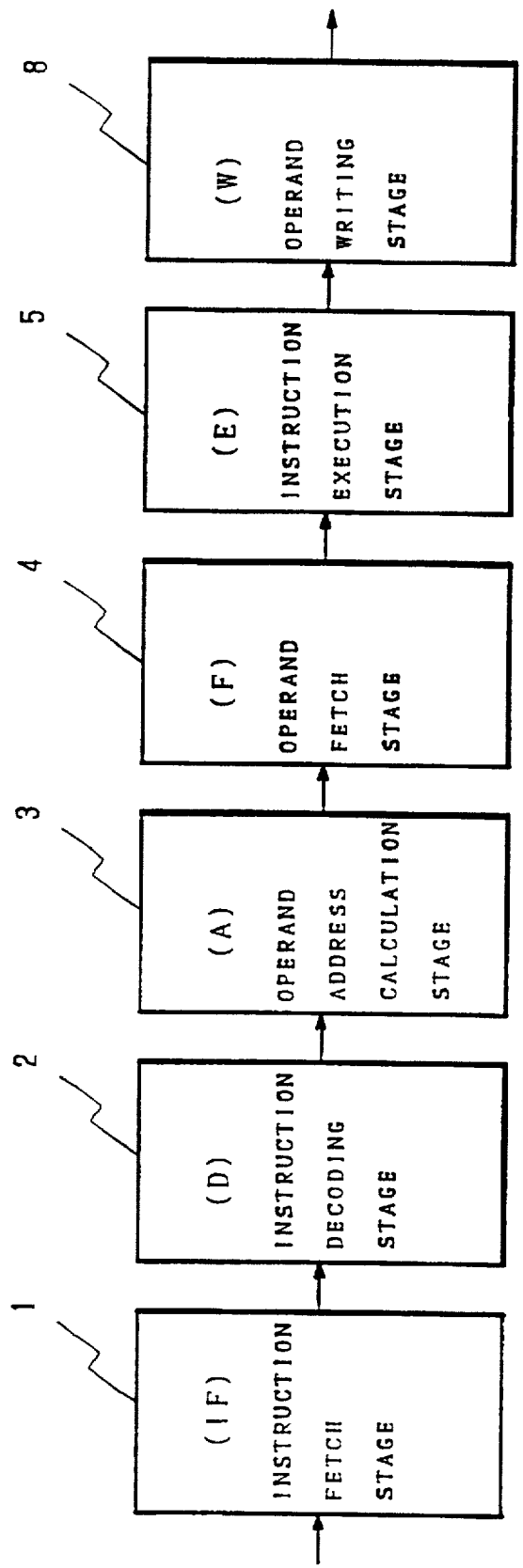
FIG. 1 is a schematic diagram showing a functional configuration of a typical pipeline processing mechanism of a conventional data processor.
Figure 2:
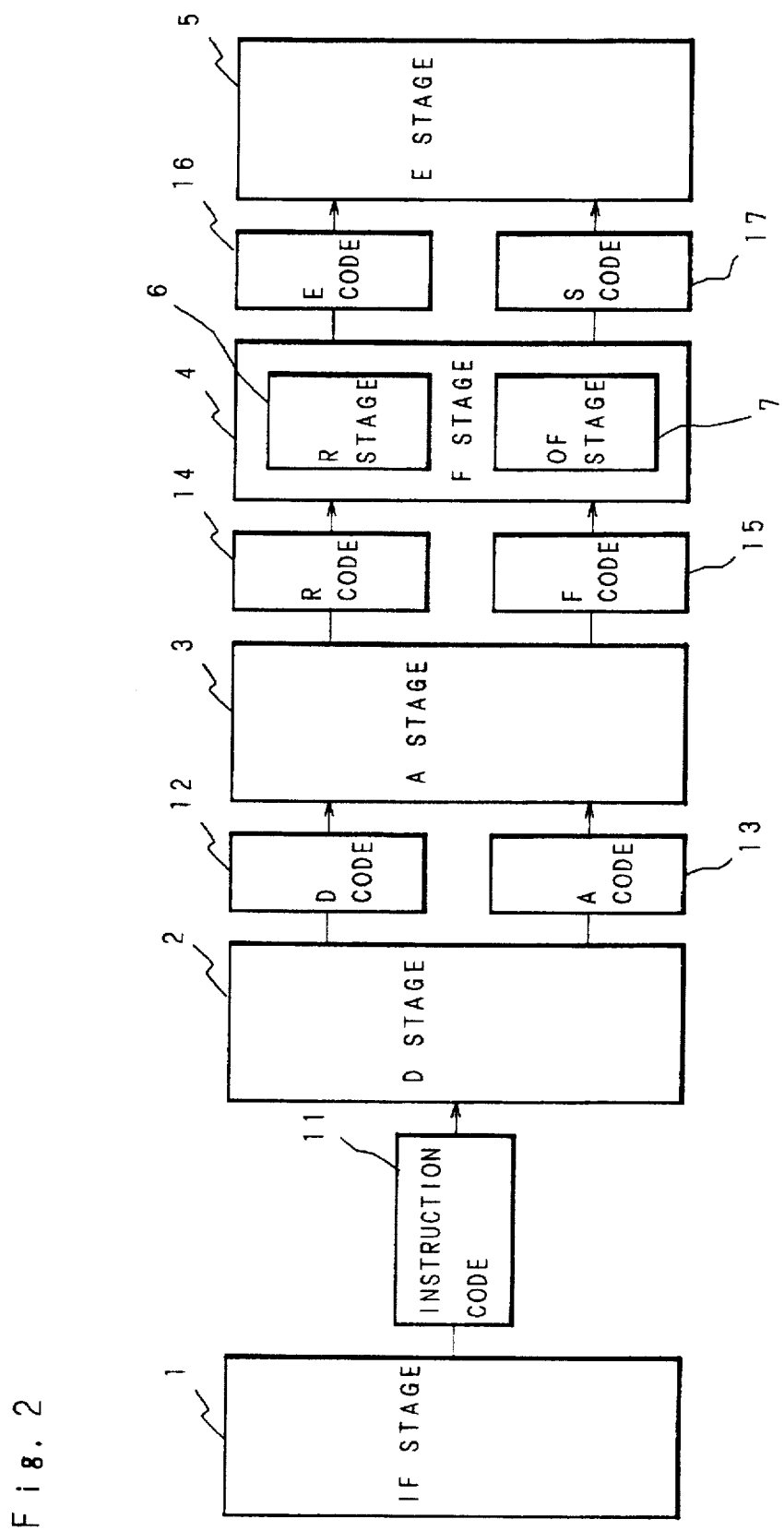
FIG. 2 is a block diagram showing a configuration of a pipeline processing mechanism of a data processor in accordance with the present invention.

FIG. 2 is a schematic diagram showing a pipeline processing mechanism of the data processor of the present invention.

The basis of pipeline processing has a five-stage configuration which comprises an instruction fetch stage (IF stage) 1 for prefetching an instruction, a decoding stage (D stage) 2 for executing instruction decoding of the first stage, an operand address calculation stage (A stage) 3 for performing address calculation of an operand and for executing instruction decoding of the second stage, an operand fetch stage (F stage) 4 consisting of a portion for performing micro ROM access (particularly called a R stage 6) and a portion for prefetch an operand (particularly called an OF stage 7), and an execution stage (E stage) 5 for executing an instruction.

The E stage 5 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent Application Laid-Open No. 63-89932 (1988).

Information transferred from the IF stage 1 to the D stage 2 is an instruction code itself. Information transferred from the D stage 2 to the A stage 3 includes two kinds of information, one on operation designated by an instruction (called a D code 12) and the other on address calculation of operand (called an A code 13).

Information transferred from the A stage 3 to the F stage 4 includes an R code 14 comprising an entry address of a microprogram or a parameter of the microprogram and an F code 15 comprising an operand address and information indicating the method of access.

Information transferred from the F stage 4 to the E stage 5 includes an E code 16 comprising operation control information and literal and an S code 17 comprising an operand or an operand address.

(1.1.) "Processing of Each Pipeline Stage"

(1.1.1) "Instruction Fetch Stage"

The instruction fetch stage (IF stage) 1 fetches an instruction from the external memory and input it to the instruction queue, and outputs an instruction code 11 to the D stage 2.

Input of the instruction queue is performed in an aligned four-byte unit.

The output unit of the instruction queue is variable on a two-byte basis, and a maximum of six bytes can be outputted during two clocks. Immediately after a branch, two bytes of the instruction base part can also be transferred directly to the instruction decoder by by-passing the instruction queue.

Instruction address to be fetched is controlled by IF stage 1. The instruction address to be fetched next is calculated by an exclusive counter as the instruction address to be inputted into the instruction queue. When branching or jumping occurs, new instruction address is transferred to the IF stage 1 from the PC calculation unit or the data operation unit.

(1.1.2) "Instruction Decoding Stage"

The instruction decoding stage (D stage) 2 decodes an instruction code inputted from the IF stage 1. Each instruction code consists of 16 bit (half word). Decoding is performed by two clock (one step) basis and an instruction code of 0 to 3 half words is consumed in the decoding processing of one time. In the D stage 2, instruction codes are decomposed to step codes which are the pipeline processing unit. That is, one instruction is decomposed into one or more step codes to be processed in following pipeline processing stages. In the D stage 2, the a code 13 which is the control code as address calculation information, the D code 12 which is the control code as the result of intermediate decoding of the operation code are inputted to the A stage 3.

In the D stage 32, control of the PC calculation unit 53 of each instruction, branch prediction processing, pre-branch processing for the pre-branch instruction and outputting processing of the instruction code from the instruction queue are also performed.

Pre-branch processing is a processing such as to predict branching of the unconditional branch instruction and conditional branch instruction, and to calculate jump target address by the PC operation unit, so that the IF stage 1 fetches the jump target instruction in order to flow the jump target instruction in the pipeline. The pre-branch instruction is an instruction which executes pre-branch processing.

(1.1.3) "Operand Address Calculation Stage"

Processing functions of the operand address calculation stage (A stage) 3 are roughly divided into two parts. One is processing for post-stage decoding of the operation code and the other is for calculation of operand address.

The post-stage decoding processing of the operation code inputs the D code 12 and outputs the R code 14 comprising write reservation information of register and memory, entry address of microprogram and parameters for microprogram. In addition, the write reservation information of the register or memory is for preventing a wrong address calculation by re-writing the content of the register or memory referred in the address calculation with the instruction preceding on the pipeline.

To avoid a dead lock, the write reservation information of the register or memory is performed on an instruction basis rather than on a step code basis.

On the write reservation information to the register or memory, detailed description is disclosed in the Japanese Patent Application No. 62-144394 (1987).

The operand address calculation unit 54 inputs the A code 13, performs address calculation according to the A code 13 by addition and memory indirect reference, and outputs the result of the calculation as the F code 15. At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 5.

Also, in the A stage 3, to prevent conflict of the stack pointer (SP) by pop operation from the stack and push operation to the stack and the like, an A stage stack pointer (ASP) is updated prior to the SP of the E stage 5, and varying of the ASP by pop and push operation is carried out in the A stage 3. Accordingly, just after usual pop and push operation, processing is carried out without delay of processing of the step code by conflict of the SP.

Method of controlling the SP is detailed described in Japanese Patent Application Laid-Open No. 62-145852 (1987).

(1.1.4) "Micro ROM Access Stage"

Processing of the operand fetch stage (F stage) 4 is also divided roughly into two parts. One is access processing of the micro ROM, particularly called the R stage 6. The other is operand prefetch processing, particularly called the OF stage 7. The R stage 6 and the OF stage 7, which do not necessarily operate at the same time, operate independently depending on whether or not the memory access right can be acquired.

The processing of the R stage 6 is the micro ROM access and micro instruction decoding processing for generating the E code 16 which is an execute control code used for execution in the following E stage 5 for the R code 14. In the case where processing for one R code 14 is decomposed into two or more microprogram steps, the micro ROM is used in the E stage 5, and the processing of the following R code 14 waits for micro ROM access. The micro ROM access to the R code 14 is performed when the last micro instruction is executed in the preceding E stage 5. In the data processor of the present invention, almost all of the basic instructions are executed in one microprogram step, therefore, there are many actual cases that the micro ROM access to the R code 14 is performed one after another.

(1.1.5) "Operand Fetch Stage"

The operand fetch stage (OF stage) 7 performs the operand prefetch processing among the above-mentioned two processings performed in the F stage 4.

In the operand prefetch processing, the F code 15 is inputted and outputs the fetched operand and the address thereof as the S code 17 are outputted. One operand indicated by the F code 15 may cross over the word boundary, but designates operand fetching of four bytes or less. The F code 15 also comprises designating of whether or not access to the operand is to be performed, and in the case where the operand address itself or the immediate value calculated in the A stage 3 is transferred to the E stage 5, no operand prefetch is performed, and the content of the F code 15 is transferred as the S code 17. In the case where the operand intended to be prefetched is included in the operand intended to be write-processed in the E stage 5, no operand prefetching is performed from the memory, but being performed by by-passing it.

(1.1.6) "Execution Stage"

The execution stage (E stage) 5 processes data using various operators, and read and write data with the E code 16 and the S code 17 taken as inputs.

There are an ALU, a barrel shifter, a priority encoder, a counter, a shift register and the like as the various operators.

The E stage 5 is controlled with the microprogram and executes instructions by carried out sequence of microprogram from the entry indicated by the R code 16. The register and the major operators are connected by three buses and one microinstruction which indicates one register-register operation is processed by two clock cycle.

This E stage 5 is a stage for executing instructions, and the whole processings performed in the stages before and in the F stage 4 are preprocessings for the processing in the E stage 5. In the case where an instruction branches, all the processings from the IF stage 1 to the F stage 4 are disabled, and a jump target address is outputted to the instruction fetch unit and the PC calculation unit.

It is possible that the E stage 5, by using a store buffer in the data operation unit 56, carries out pipeline processing of operand store with 4 bytes and execution of the next micro instruction.

In the E stage 5, the write reservation information to the register and the memory performed in the A stage 3 is released after write of the operand.

In the case where a conditional branch instruction generates a branch in the E stage 5, the branch prediction for that conditional branch instruction has been wrong, and therefore rewriting of the branch history is performed.

(1.2) "Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(2) "Pre-branch Processing of Subroutine Return Instruction"

To suppress a disturbance of the pipeline caused by execution of a subroutine return instruction in the execution stage 5, the data processor of the present invention performs pre-branch processing in the instruction decoding stage (D stage) 2 on execution of the subroutine return instruction.

Hereinafter, detailed description is made on operation.

Figure 3:
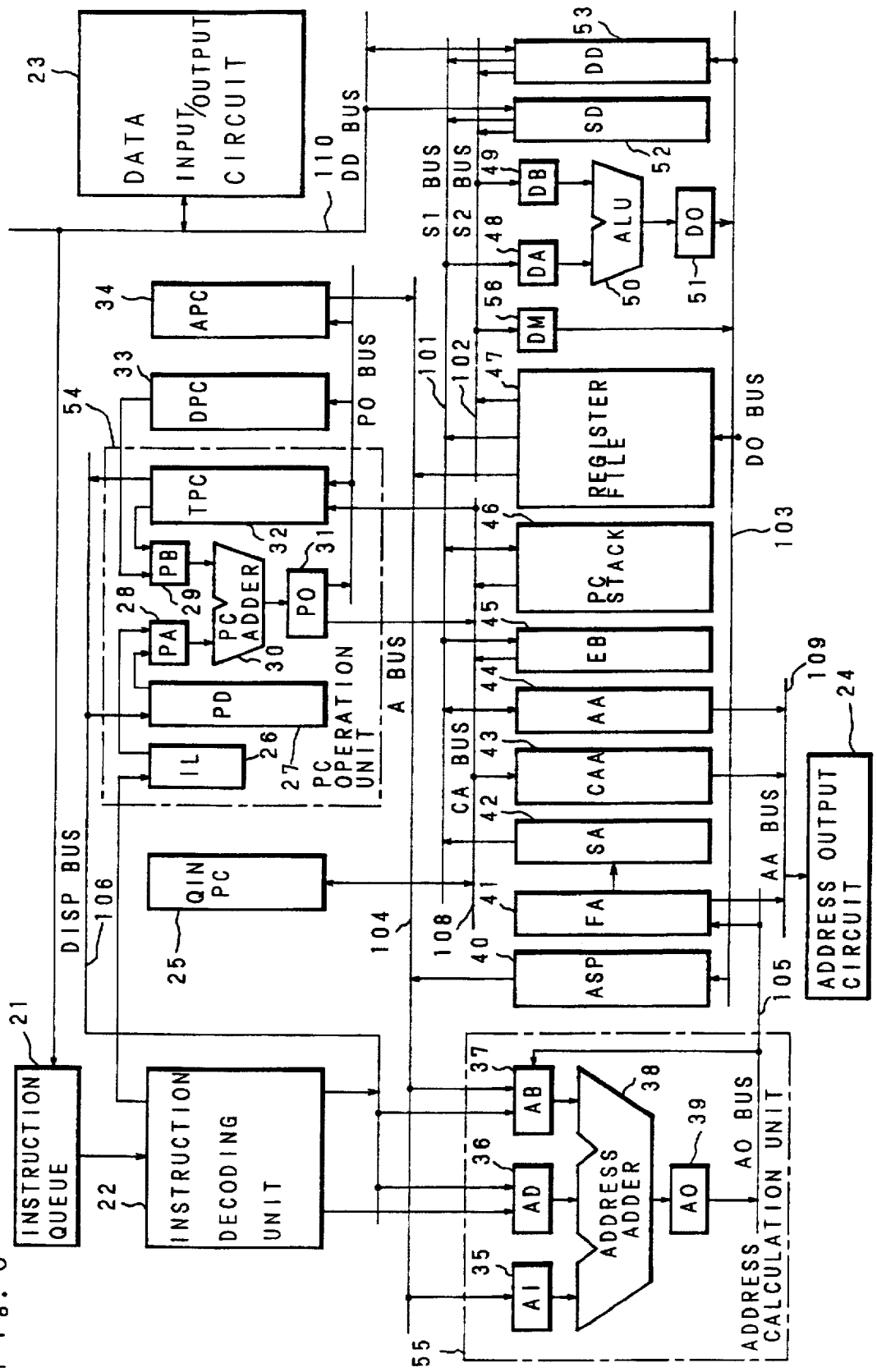
FIG. 3 is a block diagram showing a configuration of a data processor of the present invention.

FIG. 3 is a block diagram of the data processor of the present invention, wherein only portions required for describing processings of the subroutine call instruction and the subroutine return instruction are extracted for explanation.

In this figure, numeral 21 designates an instruction queue, numeral 22 designates an instruction decoding unit, numeral 23 designates a data input/output circuit sending and receiving data to and from exterior, numeral 24 designates an address output circuit outputting an address to exterior, numeral 25 designates a counter (QINPC) for outputting an address for performing instruction fetch, numeral 26 designates a latch (IL) storing an instruction length processed in the instruction decoding unit 22 every time each step code is generated, numeral 27 designates a latch (PD) for storing displacement with respect to the PC for pre-branch, numeral 30 designates a PC adder for performing addition in a PC operation unit 54, numerals 28, 29 and 31 designate input/output latches (PA, PB and PO) of the PC adder 30 respectively, numeral 32 designates a register (TPC) for storing a temporary PC on each step code processing, numeral 33 designates a D stage PC (DPC) for storing a PC of an instruction in current decoding, numeral 34 designates an A stage PC (APC) for storing the PC corresponding to the step code in address calculation, numeral 38 designates an address adder performing ternary addition for address calculation, numerals 35, 36, 37 and 39 are input/output latches (AI, AD, AB and AO) of the address adder 38 respectively, numeral 40 designates an A stage stack pointer (ASP) performing control of the SP by performing increment or decrement in the A stage 3, numeral 41 designates an F code address register (FA) for storing an address as an F code 15, numeral 42 designates an S code address register (SA) for storing an address as an S code 17, numeral 43 designates a CA address register (CAA) for temporarily storing an address for performing instruction fetching, numeral 44 designates an address register (AA) performing control in the E stage 5, numeral 45 designates an E stage branch address register (EB) for storing a branch address in the E stage 5, numeral 46 designates a PC stack for storing only return addresses at a subroutine call, numeral 47 designates a register file which includes a stack pointer, a frame pointer, a working register and the like, numeral 56 designates a DM latch which inputs a value from a S2 bus 102 and outputs the value to a DO bus 103, numeral 50 designates an ALU for data operation, numerals 48, 49 and 51 designate input/output latches DA, DB and DO of the ALU 50 respectively, numeral 52 designates an S code data register (SD) for storing data as the S code 17, numeral 53 designates a data register (DD) storing data on memory access performed in the E stage, and numerals 101 to 110 designate internal buses (S1 bus, S2 bus, DO bus, A bus, AO bus, DISP bus, PO bus, CA bus, AA bus and DD bus) for performing transfer of data and addresses respectively in interior. Numeral 54 designates a PC operation unit and numeral 55 designates an address calculation unit.

Figure 4:
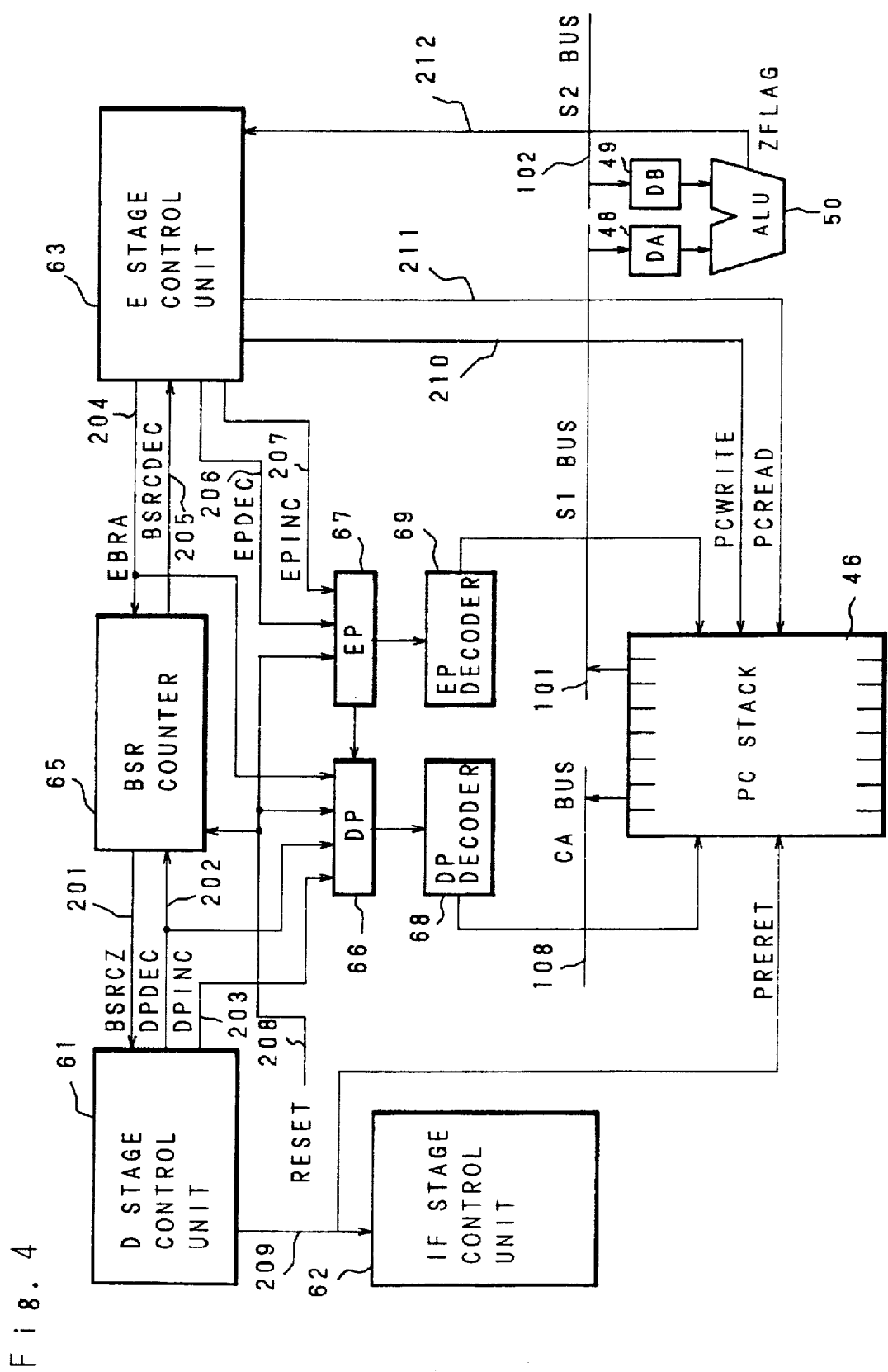
FIG. 4 is a block diagram showing a detailed configuration of a main part of the same.

FIG. 4 is a block diagram of portions relating particularly to pre-branch processing of the subroutine return instruction in the data processor of the present invention.

In this figure, numeral 61 designates a D stage control unit, numeral 62 designates an IF stage control unit, numeral 63 designates an E stage control unit, numeral 65 designates a BSR counter which is a three-bit counter for counting the number of the subroutine call instruction on half way of the pipeline processing, numeral 66 designates a three-bit PC stack pointer (DP) controlled by the D stage 2, numeral 67 designates a three-bit PC stack pointer (EP) controlled by the E stage 5, numerals 68 and 69 designate decoders decoding the DP 66 and the EP 67 respectively, and numerals 201 to 212 designates control signals, of the respective unit. In this figure, a clock signal for controlling timing is omitted for simplification sake.

In this embodiment, the PC stack 46 is configured with eight entries. Also, an instruction code is formed by 16 bits, and therefore no odd address exists for the PC, and the return address field is formed with 31 bits. Where the return address is read-out from the PC stack 46, the least significant bit is outputted as '0'. The DP 66 and EP 67 are constituted with three bits, but carry from the most significant bit at increment and borrow from the most significant bit at decrement are neglected. This means that the PC stack 46 is handled as a ring-like stack memory wherein the entry pointed by '000' of the pointer and the entry pointed by '111' of the pointer adjoin each other.

(2.1) "Outline of Operation of PC Stack"

Explanation will be given on the subroutine call instruction and the subroutine return instruction in the data processor of this invention.

In the data processor of the present invention, a branch subroutine (BSR) instruction and a jump subroutine (JSR) instruction are provided as a subroutine call instruction.

Also, as a subroutine return instruction, a return subroutine instruction (RTS) and an EXITD instruction are provided. The EXITD instruction performs subroutine return for high level language and parameter release at a time as a high-function instruction.

When the subroutine call instruction is executed, the return address from the subroutine is pushed to the PC stack in the E stage 5. When the subroutine return instruction is decoded, pre-branch (pre-return) processing is performed to the address stored in the stack top of the PC stack 46 in the D stage 2.

Branching processing is executed at the decoding stage as the initial stage of the pipeline, so that disorder of the pipeline processing by execution of the subroutine return instruction is largely reduced.

In the E stage 5, the address to which pre-return is executed and the true return address read from the memory are compared, and where the compared result is not coincident, branch processing to the true return address is performed.

Detailed description is made hereinafter including renewals of the pointers DP 66 and EP 67 and the like.

In the reset state, the BSR counter 65 and the EP 67 are cleared to '0' corresponding to a RESET signal 208, and the value of the EP 67 kept to '0' is copied into the DP 66.

First, an instruction code 11 fetched from the instruction queue 21 is decoded in the instruction decoding unit 22. As a result of decoding, where the fetched instruction is the subroutine call instruction, decrement of the DP is performed corresponding to a DPDEC signal 202, and the BSR counter 65 is counted up. In the address calculation stage 3, the return address is calculated by the address adder 38, being transferred to the FA register 41 through the AO bus 105.

In the F stage 4, the value of the FA register 41 is transferred to the SA register 42. When the subroutine call instruction is executed in the E stage 5, the value of the EP 67 is pre-decremented corresponding to an EPDEC signal 206. Then, the value of the return address stored in the SA register 42 is written-in to the PC stack 46 pointed by the EP 67 which has been renewed corresponding to a PCWRITE signal 201 in the PC stack 46 through the S1 bus 101. Also, the BSR counter 65 is decremented by a BSRCDEC signal 205. In the BSR instruction, branch processing to the head address of the subroutine is performed in the D stage 2, and therefore no branch processing is required to be performed in the E stage 5.

Next, description is made on processing of the subroutine return instruction.

When an instruction fetched from the instruction queue 21 is the subroutine return instruction, a BSRCZ signal 201 indicating whether or not the value of the BSR counter 65 is zero is checked. If the value of the BSR counter 65 is not zero, the D stage 2 suspends processing until the value of the BSR counter 65 becomes zero. That the value of the BSR counter 65 is not zero shows that the corresponding subroutine call instruction is still remained in the pipeline without being executed in the E stage 5, and shows that the corresponding return address is not yet registered in the PC stack 46.

When the BSRCZ signal 201 indicates that the value of the BSR counter 65 is zero or has become zero, the D stage control unit 61 informs the IF stage control unit 62 and the PC stack 46 to perform pre-return processing corresponding to a PRERET signal 209. The PC stack 46 outputs the content of the PC stack 46 pointed by the DP 66 to the CA bus 108. The IF stage control unit 62 disables all of instruction data fetched in the instruction queue 21, fetches the instruction of the return address according to the value outputted to the CA bus, and sends the fetched instruction data to the instruction decoding unit 22. After the content of the PC stack 46 has been outputted to the CA bus 108, the DP 66 is post-decremented corresponding to a DPING signal 203.

In the RTS instruction, the true return address is fetched from the memory at the F stage 4 and is taken into the SD register 52. Also, in the EXITD instruction, true return address is taken into the DD register 53 from the memory during execution of the instruction. The content of the PC stack 46 pointed by the EP 67 corresponding to the PCREAD signal 211 is outputted to the S1 bus 101, and is taken into the DA latch 48 as an input latch of the ALU 50. The value taken into the DA latch 48 is the return address when the subroutine return instruction under processing at the E stage 5 executes pre-return. The true return address taken into the SD register 52 or the DD register 53 is taken into the DB latch 49 through the S2 bus 102. In the ALU 50, the content of the DA latch 48 and the content of the DB latch 49 are compared, and the zero flag (ZFLAG) signal 49 is sent to the E stage control unit 63.

In the E stage control unit 63, when the compared result is coincident, it means that pre-return has been exactly done, so that execution of the subroutine return instruction is finished.

When compared result is not coincident, the return address to which pre-return is executed was wrong. At this time, value of the true return address is transferred to the EB register 45 through the S1 bus 101, thereafter the value of the EB register 45 is outputted to the CA bus 108. The IF stage 1 fetches the instruction by the value outputted to the CA bus 108.

When the subroutine return instruction is executed, in the E stage 5, whether or not the return address having undergone pre-return has been correct is checked. This means that since the PC stack 46 is configurated with eight entries, where a subroutine call becomes an input of nine or more levels, the data of the return address relating to the subroutine call of levels higher than eight levels is overwritten and destroyed. Also, when the value of the return address on the external memory by a program, processing is returned to another address which is differ from the address registered in the PC stack 46. To prevent this destruction, in the E stage 5, whether or not the pre-return has been executed correctly is checked. However, the value of the return address on the external memory is scarcely rewritten, and on the subroutine call of eight levels from the deepest subroutine level, the correct value is stored all the time in the PC stack 46, and therefore the probability that pre-return is correctly performed is very high.

The before-mentioned BSR counter 65 is provided to perform a correct pre-return even immediately after the BSR instruction wherein pre-branch is performed, and reliably perform comparison in the E stage 5. During processing of the BSR instruction, if this function is not provided, where the subroutine return is executed in the D stage after processing has been completed in the D stage, but before the value of the return address is written to the PC stack 46 in the E stage 5, pre-return processing is performed to a wrong return address because the return address of the corresponding subroutine return instruction is not yet registered.

Furthermore, in the stage wherein the subroutine return instruction is processed in the E stage 5, the preceding subroutine call instruction has already been processed, and the correct return address is kept registered in the PC stack 46, and therefore the compared result is coincident in the E stage 5, and the processing is carried out assuming that the pre-return has been correct. This means that a wrong operation is made in such a case. However, by providing the function of the BSR counter, the pre-return is performed after the value of the return address to be referred has been registered by the preceding subroutine call instruction.

Also, in executing the subroutine call instruction, the PC stack 46 is not rewritten after the PC stack 46 has been referred in the D stage 2 until it is processed in the E stage 5, and therefore the return address to which pre-return processing is executed in the D stage 2 is referred correctly in the E stage 5.

In the JSR instruction performing no pre-branch, the branch processing to the branch target address is performed in the E stage 5, and therefore, even if the RTS instruction performs pre-return by referring the PC stack 46 before register by execution of the JSR instruction, the pipeline processing is canceled before the RTS instruction itself is executed, and therefore such a wrong operation does not take place.

As described above, by installing the PC stack 46 storing only the return address at a subroutine call, the pre-return to the return address is performed for the subroutine return instruction in the decoding stage and thereby a disturbance of the pipeline in execution of the subroutine return instruction can be avoided.

Where a branching takes place in the E stage 5, the value of the BSR counter 65 is cleared to '0' corresponding to a EBRA signal 204, and the content of the EP 67 is copied into the DP 66. Where a branching takes place in the E stage 5, all of processings in the IF stage 1 through the F stage 4 are disabled, and therefore the subroutine call instruction on half way of processing which has been decoded in the D stage 2, but has not been executed in the E stage 5, renewals of the BSR counter 65 and the DP 66 performed for the subroutine return instruction are disabled, and the value of the return address of the PC stack 46 up to that level can be referred correctly in the D stage 2.

(2.2) "Detailed Operations of Subroutine Call Instruction and Subroutine Return Instruction"

The above description has been made on outline of operations of the subroutine call instruction and the subroutine return instruction, and here description is made on detailed operations of the respective instructions.

Figure 5:
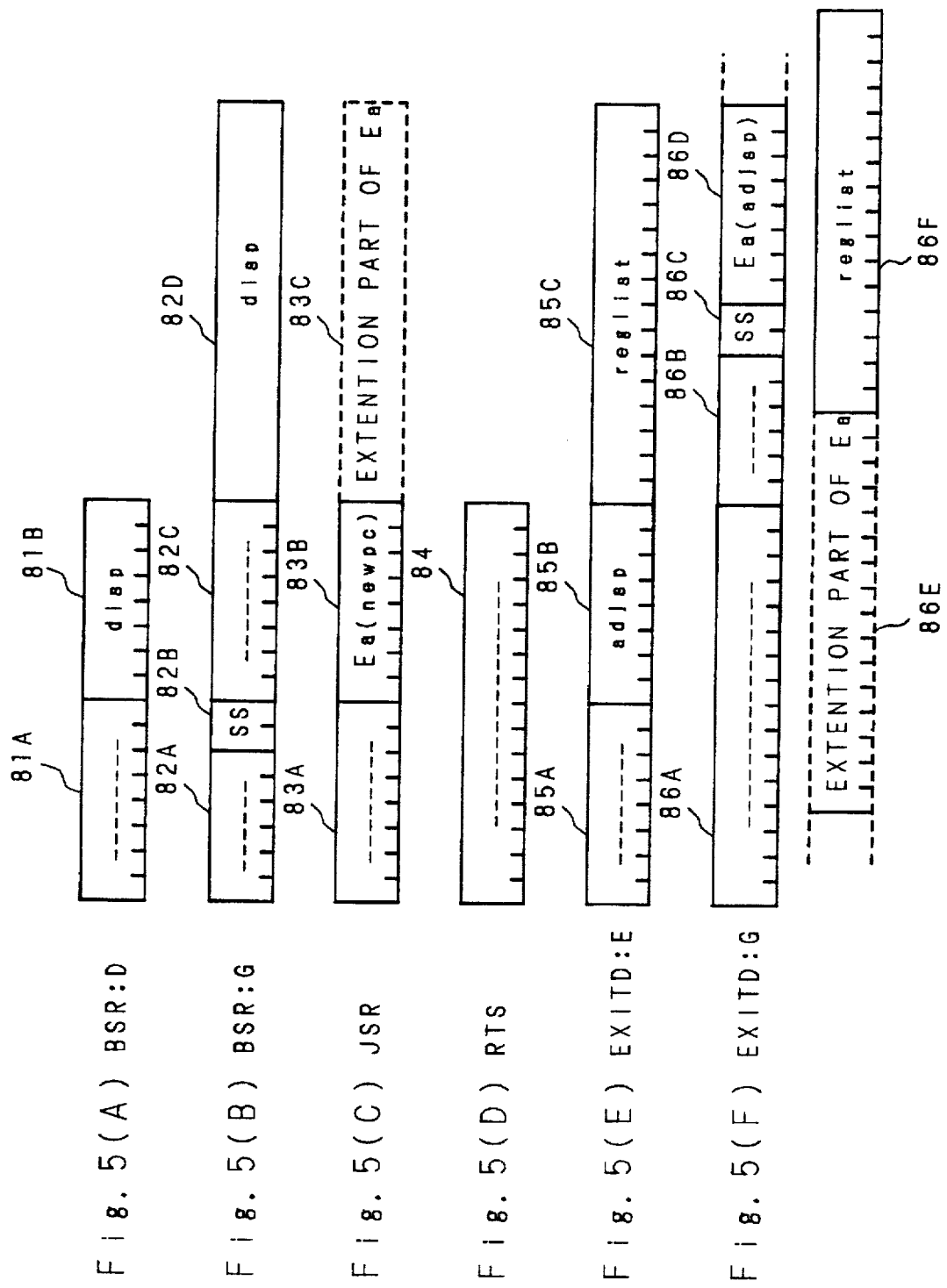
FIG. 5 is a schematic diagram showing bit allocation of each instruction used for the data processor of the present invention.

In the data processor of the present invention, the branch subroutine (BSR) instruction and the jump subroutine (JSR) instruction are provided as the subroutine call instructions. Also, as the subroutine return instructions, the return subroutine (RTS) instruction and the EXITD instruction performing subroutine return for high level language and parameter release at a time as a high-function instruction are provided. FIG. 5 shows bit allocation of each instruction. An operation code is shown by '____'.

(2.2.1) "BSR Instruction"

The BSR instruction is a subroutine call instruction supporting only the PC-relative addressing, the return address thereof is made to save in the stack.

As shown in FIGS. 5(A) and 5(B), the BSR instruction has two instruction formats; the general format (G format) and the reduced format (D format). In the D stage 2, similar processing is performed in either of the formats. This instruction is processed as one step code.

Figure 6:
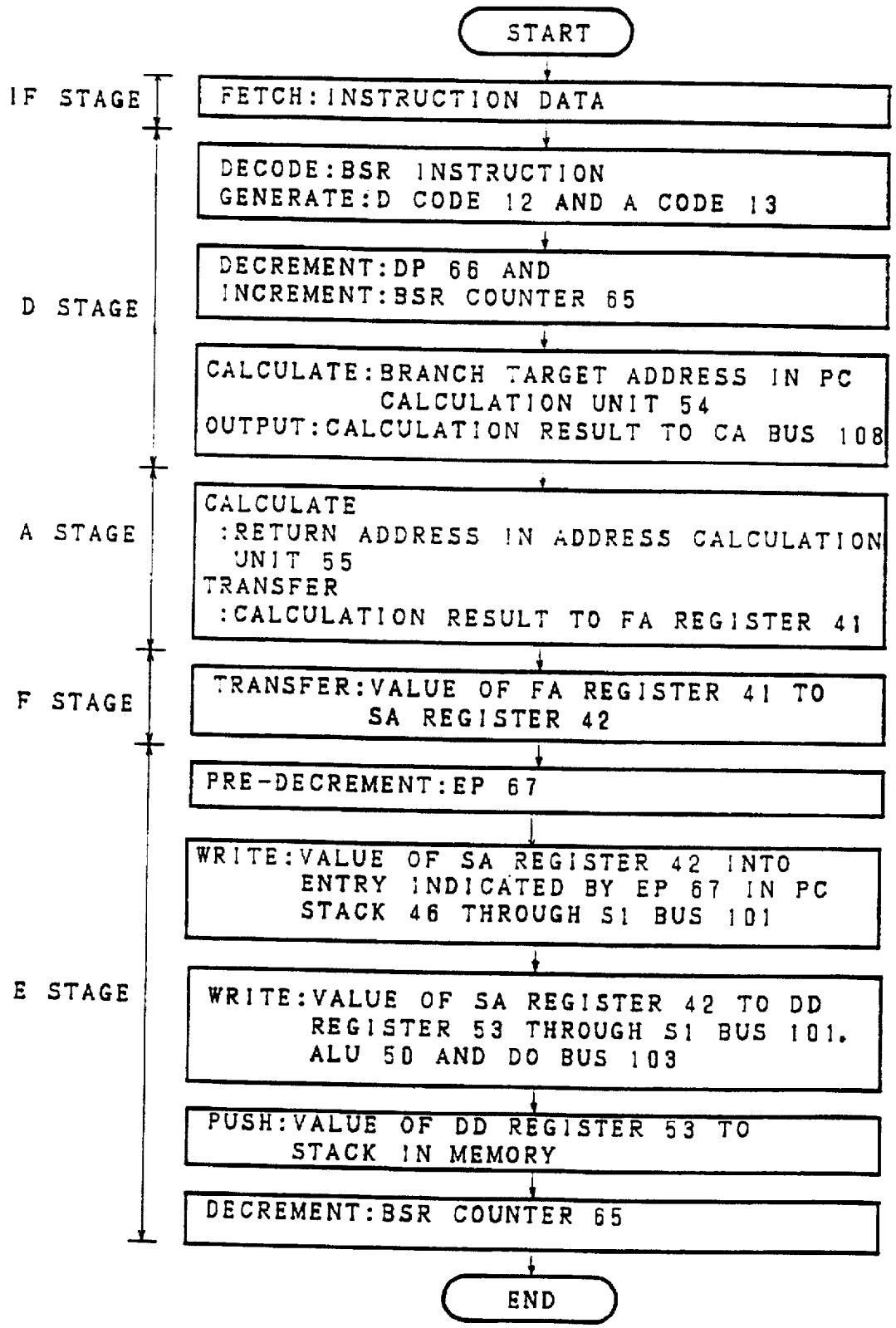
FIG. 6 is a flow chart showing processing procedures of BSR instruction.

FIG. 6 shows a flow chart of execution of the BSR instruction.

When the BSR instruction is processed in the instruction decoding unit 22, a D code 12 indicating a step code of the BSR instruction and an A code 13 for calculating the return address are produced. In the case of the G format instruction, the value of a displacement 82D is also fetched simultaneously according to a field 82B indicating the size of displacement. Also, decrement of the DP 66 and increment processing of the BSR counter 65 are performed corresponding to the DPDEC signal 202. This instruction is an instruction performing pre-branching, calculation of jump target address is performed in the PC operation unit 54, and the result of the operation is outputted to the CA bus in order to perform pre-branch processing.

In the A stage 3, the return address is calculated in the address calculation unit 55 according to the indication of the A code 13, being transferred to the FA register 41 through the AO bus 105.

In the F stage 4, the value of the FA register 41 is transferred to the SA register 42.

In the E stage 5, first, pre-decrement of the EP 67 is performed corresponding to the EPDEC signal 206. Subsequently, the value of the SA register 42 storing the return address is written to the entry pointed by the EP 67 in the PC stack 46 through the S1 bus 101 corresponding to the PCWRITE signal 210. At the same time, the value of the S1 bus 101 is written into the DD register 53 through the ALU 50 and the DO bus 103, and the value of the DD register 53 storing the return address is pushed to the stack in the memory controlled with software by the stack pointer. After registration of the return address in the PC stack 46, the BSR counter 65 is decremented corresponding to the BSRCDEC signal 205. In this instruction, the branch processing has already been performed in the D stage 2, and therefore no branch processing is performed in the E stage.

(2.2.2) "JSR Instruction"

FIG. 5(C) shows bit allocation of the JSR instruction.

The JSR instruction is an instruction of performing subroutine jump to the effective address of a NEWPC 83c, and the return address is made to save to the stack.

As to the jump target address, specifying of a plural stages of addressing extension can be made, but description is made on the case where no designation of extension is made for simplification sake.

The JSR instruction is processed while divided into two step codes in the D stage 2. A first step code performs processing relating to the jump target address, and a second step code performs processing relating to the return address.

First, description is made on the processing relating to the first step code. When the JSR instruction is decoded in the instruction decoding unit 22, the D code 12 indicating the first step code of the JSR instruction and the A code 13 for calculating the effective address of the jump target address are produced. Where the extension part 83c for absolute address, displacement or the like are required for address calculation of the jump target address, the data therefor is also fetched simultaneously from the instruction queue 21.

In the A stage 3, the jump target address is calculated in the address calculation unit 55 according to an indication of the A code 13, being transferred to the FA register 41 through the AO bus 105. In the F stage 4, the value of the FA register 41 is transferred to the SA register 42. In the E stage 5, the value of the SA register 42 storing the jump target address is transferred to the EB register 45 through the S1 bus 101.

Next, description is made on the processing relating to the second step code.

In the D stage 2, the D code 12 indicating the second step code of the JSR instruction and the A code 13 for calculating the effective address of the return address are produced. In the processing of this step code, instruction data are not fetched from the instruction queue 21. Also, decrement processing of the DP 66 and increment processing of the BSR counter 65 are performed corresponding to the DPDEC signal 202.

In the A stage 3, the return address is calculated in the address calculation unit 55 according to an indication of the A code 13, being transferred to the FA register 41 through the AO bus 105.

In the F stage 4, the value of the FA register 41 is transferred to the SA register 42.

In the E stage 5, first, pre-decrement of the EP 67 is performed corresponding to the EPDEC signal 206. Subsequently, the value of the SA register 42 storing the return address is written to the entry pointed by the EP 67 in the PC stack 46 through the S1 bus 101. Also, at the same time, the value of the S1 bus 101 is written into the DD register 53 through the ALU 50 and the DO bus 103, and the value of the DD register storing the return address is pushed to the stack in the memory controlled with software by the stack pointer. Branch processing is performed by outputting the value of the jump target address having already been written into the EB register 45 by the first step code to the CA bus 108. At this time, the BSR counter 65 is cleared corresponding to the EBRA signal 204, and the value of the EP 67 is copied into the DP 66.

As described above, also in the case of the JSR instruction, the processing relating to the PC stack 46 is the same as the case of the BSR instruction.

(2.2.3) "RTS Instruction"

The RTS instruction is an instruction for performing a return from the subroutine, and jumps to the return address restored from the stack. This instruction is processed as one step code.

Figure 7:
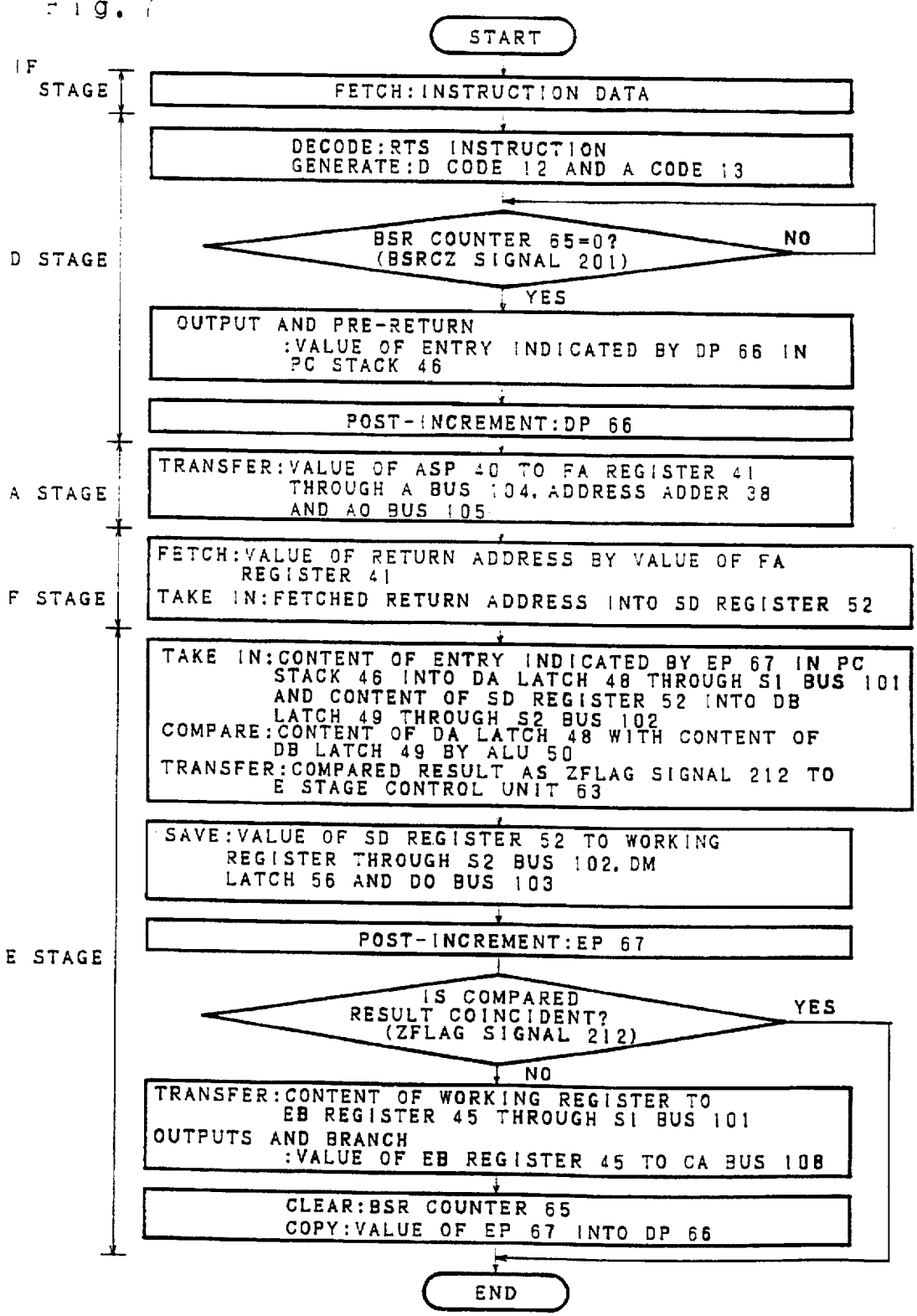
FIG. 7 is a flow chart showing processing procedures of an RTS instruction.

FIG. 7 shows a flow chart in execution of the RTS instruction.

When the RTS instruction is processed in the instruction decoding unit 22, the D code 12 indicating the step code of the RTS instruction and the A code 13 for calculating the address of the stack top are produced. This instruction is an instruction for performing a pre-return. Where presence of the subroutine call instruction in the pipeline is indicated corresponding to the BSRCZ signal 201, processing is suspended until the content of the BSR counter 65 becomes zero. Where the content of the BSR counter 65 is zero, pre-return processing is performed. The content of the entry pointed by the DP 66 in the PC stack 46 is outputted to the CA bus 108 corresponding to the PRERET signal 209, and pre-branch processing (pre-return) is performed. Also, after referring to the PC stack 46, post-increment processing is performed corresponding to the DPING signal 203.

In the A stage 3, the stack top address is calculated in the address calculation unit 55 according to a indication of the A code 13, being written into the FA register 41 through the AO bus 105. The stack top address is just the value of the ASP 40.

In the F stage 4, an operand is fetched by the value of the FA register 41 and taken into the SD register 52. The value taken into SD register 52 is the true return address which is saved on the stack.

In the E stage 5, corresponding to the PCREAD signal 211, the content of the entry pointed by the EP 67 in the PC stack 46 storing the return address referred at pre-return is outputted to the S1 bus 101 and taken into the DA latch 48. The content of the SD register 52 storing the true return address is taken into the DB latch 49 through the S2 bus 102. In the ALU 50, the address to which pre-return is executed and the true return address are compared in order to transfer the compared result as the ZFLAG signal 212 to the E stage control unit 63. Also, at the same time, the content of the SD register 52 is saved in the working register in the register file 47 through the S2 bus 102, DM latch 56 and DO bus 103. After referring to the PC stack 46, post-increment of the EP 67 is performed corresponding to an EPTNC signal 207.

If the compared result is coincident, it shows that the pre-return has been performed to the correct address, and the E stage 5 executes NOP (No Operation) for one micro cycle and completes the execution of the instruction.

Where the compared result is not coincident, it shows that the return address whereto pre-return has been performed is wrong, and the value of the return address saved in the working register is transferred to the EB register 45 through the S1 bus 101, and the value of the EB register 45 is outputted to the CA bus 108, and branch processing is performed. At this time, corresponding to the EBRA signal 204, the BSR counter 65 is cleared, and the value of the EP 67 is copied into the DP 66.

The EXITD instruction is a high-function instruction for performing release of parameters for high level language, restoration of the saving register, return from the subroutine and release of subroutine parameters in the stack.

As shown in FIGS. 5(E) and 5(G), the EXITD instruction has two instruction formats, the G format and the E format.

In the G format, this instruction is processed as three step codes, and in E format, it is processed as one step code. Description is made only on the E format as shown in FIG. 5(E) for simplification sake.

When the EXITD instruction is processed in the instruction decoding unit 22, the D code 12 showing the step code of the EXITD instruction and the A code 13 for transferring the immediate value are produced. A correction value 85B as a literal of the stack pointer is sent by the D code 12. In this instruction, the value of a bit map data 85c of two-byte of the register to be restored is also fetched at the same time, being transferred as the immediate value of the A code 13. This instruction is an instruction for performing a pre-return. Where presence of the subroutine call instruction in the pipeline is indicated corresponding to BSRCZ signal, processing is temporarily suspended until the content of the BSR counter 65 becomes zero. Where the content of the BSR counter 65 is zero, pre-return processing is performed. Corresponding to the PRERET signal 209, the content of the entry pointed by the DP 66 in the PC stack 46 is outputted to the CA bus 108, and pre-branch (pre-return) processing is performed. Also, after referring to the PC stack 46, post-increment processing of the DP 66 is performed corresponding to the DPING signal 203.

In the A stage 3, the immediate value is transferred in the address calculation unit 55 according to a indication of the A code 13, being written to the FA register 41 through the AO bus 105.

In the F stage 4, the value of the FA register 41 is transferred to the SA register 42.

In the E stage 5, after performing processings such as restoration of the saving register from the stack, release of the stack frame and restoration of the frame pointer from the stack, the value of the return address is popped from the stack into the DD register 53. Also, correction of the stack pointer is performed to release the subroutine parameters. Corresponding to the PCREAD signal 211, the content of the entry pointed by the EP 67 in the PC stack 46 storing the return address referred at pre-return is outputted to the S1 bus 101, being fetched into the DA latch 48. Then, the content of the DD register 53 storing the true return address is fetched into the DB latch 49 through the S2 bus 102.

In the ALU 50, the address whereto the pre-return has been performed is compared with the pre-return address, and the comparison result is sent to the E stage control unit 63 as a ZFLAG signal 212. Also, at the same time, the content of the SD register 52 is made to save to the working register in the register file 47 through the S2 bus 102, the DM latch 56 and the DO bus 103. After referring to the PC stack 46, post-increment of the EP 67 is performed corresponding to the EPINC signal 207.

If the comparison result agrees with each other, it shows that the pre-return has been performed to the correct address, and the E stage 5 executes NOP for one micro cycle, completing the execution of the instruction. Where the comparison result does not agree, it shows that the return address whereto the pre-return has been performed is wrong, and the value of the true return address saved in the working register is transferred to the EB register 45 through the S1 bus 101, and the value of the EB register 45 is outputted to the CA bus 108, and branch processing is performed. At this time, corresponding to the EBRA signal 204, the BSR counter 65 is cleared, and the value of the EP 67 is copied into the DP 66.

As described above, also in the case of the EXITD instruction, the processing relating to the PC stack is the same as the case of the RTS instruction.

In this embodiment, the PC stack 46 is configurated with eight entries. Accordingly, when a subroutine call is a nest of nine or more levels, another return address is overwritten onto the entry storing the valid return address, and therefore the initial value is erased. Accordingly, except for the special case of performing a recursive call, a nest of nine or more levels results in a wrong pre-return. Re-write of the return address in an external memory by a program also results in a pre-return to a wrong return address. For this reason, whether or not the pre-return has been correct is required to be checked in the E stage. The number of entries of the PC stack to be installed has only to be determined by a compromise between the performance problem of the number of levels of depth of the subroutine call allowing a correct pre-return and the amount of increase in hardware.

In this embodiment, to assure to make a correct operation even if the return address from a subroutine is rewritten in the subroutine, the correct return address from the subroutine fetched from the outside of the CPU in executing the RTS instruction is compared with the address which is fetched from the PC stack 46 and is used for pre-return. If software wherein the return address from the subroutine is not re-written has only to be executed (in the practical application program, the return address from the subroutine is scarcely rewritten), the return address of the subroutine is not required to be fetched from the outside of the CPU. Whether or not the return address of the subroutine in the PC stack 46 is re-written has only to be checked by installing a flag showing "valid" or "invalid" of the PC stack value or the like. This means that if the matching characteristic of the stack storing the return address from the subroutine in a memory outside the CPU is assured, whether or not the pre-return is correct is judged only by the controlling mechanism of the PC stack 46, and only when the return address of the correct subroutine is not obtained from the PC stack, the return address of the subroutine has only to be fetched from the memory outside the CPU to return to that address.

In this embodiment, the BSR counter 65 is provided to perform a reliable pre-return, but where the pre-branch processing of the subroutine call instruction is not performed, pre-branch processing to the jump target address is performed without fail after the subroutine call has been executed, and the pipeline processing is canceled, and therefore this function is not necessary. Also, the pointer 66 is decremented when the BSR instruction is decoded in the D stage 2, but it is also possible that the value of the pointer EP 67 which is decremented when the BSR instruction is executed in the E stage 5 is copied.

Also, in this embodiment, whether or not the pre-return has been performed correctly is checked in the E stage 5, and therefore the return address whereto pre-return has been performed is referred to the PC stack 46, and is compared with the correct return address fetched form the memory outside the CPU, but it is also possible that the return address whereto pre-return has been performed is made to save in the D stage 2, and that saved value is referred in the E stage 5.

Also, in the above-described embodiment, a counter is used as a means for detecting whether or not a stage after the D stage 2 is processing the subroutine call instruction, but it is also possible that a flag for subroutine call instruction is provided on every step code or on every pipeline stage, and pre-return processing is performed only when all the flags are not set.

Also, even if the BSR counter or the above-mentioned alternative flag function is removed to curtail software, a correct operation can be performed because whether or not the pre-return has been correct is checked in executing the subroutine return instruction. The deterioration in performance at this time depends upon the frequency of simultaneous fetching of the subroutine call instruction and the corresponding subroutine return instruction into the pipeline.

Also, in the above-described embodiment, two pointers of the pointer DP 66 controlled by the D stage 2 and the pointer EP 67 controlled by the E stage 5 are provided as pointers for the PC stack 46. This intends that the correct return address can be referred even when a plurality of subroutine instructions are processed in the pipeline. The EP 67 changes in correspondence to the subroutine call instruction and the subroutine return instruction which have been executed in the E stage 5. The DP 66 changes in the instruction decoding stage, and therefore, even if two or more subroutine return instructions are fetched into the pipeline, the return address of the corresponding subroutine call instruction can be referred. When branch processing is performed in the E stage 5, the pipeline processing is canceled, and therefore the value of the EP 67 is copied into the DP 66. When the subroutine return instruction is executed, whether or not the pre-return has been correct is checked, and therefore a correct operation can be performed even if all the pointer controls of the PC stack 46 are performed only by the EP 67 to curtail hardware. The deterioration in performance at this time depends upon the frequency of simultaneous fetching of two or more subroutine return instructions into the pipeline. When one pointer is used, a flag for subroutine return instruction is provided, and when a subroutine return instruction is executed in and after the A stage 3, the flag is kept set, and when the flag is kept set, pre-return processing is made to wait, and thereby a reference to the PC stack 46 can be performed after the pointer has been changed-over correctly, and therefore a correct pre-return can be performed.

Also, the PC stack 46 of the present invention works efficiently if it is accessed also at pre-return and also when whether or not the pre-return has been performed correctly is judged, and is accessed independent of access to a memory outside the CPU. For this purpose, in a data processor such as a microprocessor wherein the CPU can be realized by one IC chip, the PC stack 46 is comprised in the same IC, and thereby the PC stack 46 can be accessed independent of access to a memory outside the CPU.

As described above, in accordance with the present invention, by providing the PC stack storing only the return address of the subroutine call instruction, branch processing of the subroutine return instruction can be performed before processing in the instruction execution stage, and thereby the overhead of the pipeline processing due to execution of the subroutine return instruction can be curtailed, and therefore the present invention provides an effect of obtaining a high-performance data processor.

(3) "Description of Another Embodiment"

Explanation will be given on the data processor of another (second) embodiment of the present invention.

(3.1) "Pre-branch Processing of Subroutine Return Instruction"

To suppress a disturbance of the pipeline caused by execution of a subroutine return instruction in the execution stage 5, the data processor of the second embodiment of the present invention performs pre-branch processing in the instruction decoding stage (D stage) 2 on execution of the subroutine return instruction.

Hereinafter, detailed description is made on operation.

Figure 8:
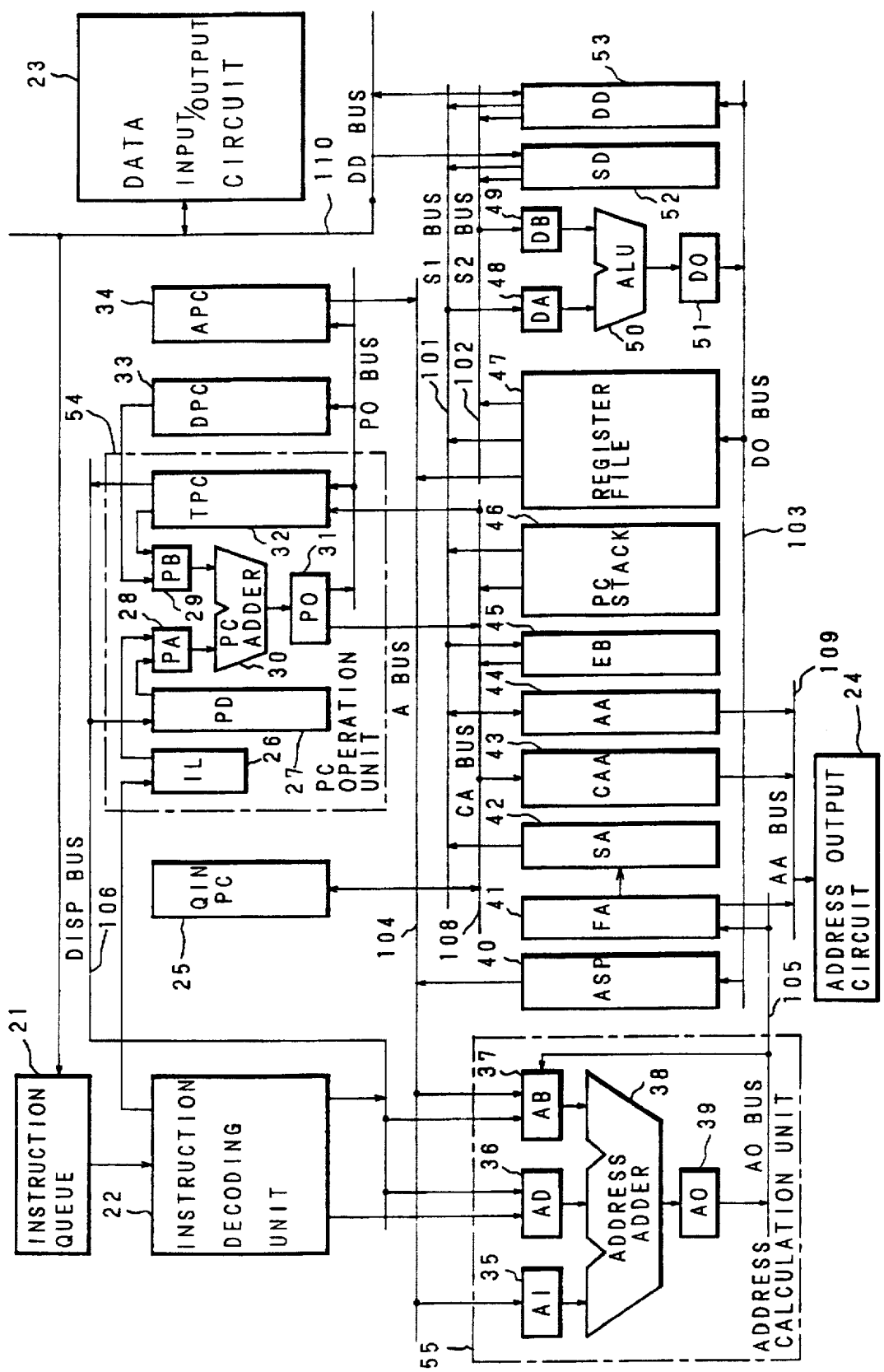
FIG. 8 is a block diagram showing a configuration of a pipeline processing mechanism of a data processor of another embodiment in accordance with the present invention.

FIG. 8 is a block diagram of the data processor of the second embodiment of the present invention, wherein only portions required for describing processings of the subroutine call instruction and the subroutine return instruction are extracted for explanation.

In this figure, numeral 21 designates an instruction queue, numeral 22 designates an instruction decoding unit, numeral 23 designates a data input/output circuit sending and receiving data to and from exterior, numeral 24 designates an address output circuit outputting an address to exterior, numeral 25 designates a counter (QINPC) for outputting an address for performing instruction fetch, numeral 26 designates a latch (IL) storing an instruction length processed in the instruction decoding unit 22 every time each step code is generated, numeral 27 designates a latch (PD) for storing displacement with respect to the PC for pre-branch, numeral 30 designates a PC adder for performing addition in a PC operation unit 54, numerals 28, 29 and 31 designate input/output latches (PA, PB and PO) of the PC adder 30 respectively, numeral 32 designates a register (TPC) for storing a temporary PC on each step code processing, numeral 33 designates a D stage PC (DPC) for storing a PC of an instruction in current decoding, numeral 34 designates an A stage PC (APC) for storing the PC corresponding to the step code in address calculation, numeral 38 designates an address adder performing ternary addition for address calculation, numerals 35, 36, 37 and 39 are input/output latches (AI, AD, AB and AO) of the address adder 38 respectively, numeral 40 designates an A stage stack pointer (ASP) performing control of the SP by performing increment or decrement in the A stage 3, numeral 41 designates an F code address register (FA) for storing an address as an F code 15, numeral 42 designates an S code address register (SA) for storing an address as an S code 17, numeral 43 designates a CA address register (CAA) for temporarily storing an address for performing instruction fetching, numeral 44 designates an address register (AA) performing control in the E stage 5, numeral 45 designates an E stage branch address register (EB) for storing a branch address in the E stage 5, numeral 46 designates a PC stack for storing only a return address at a subroutine call, numeral 47 designates a register file comprising a stack pointer, a frame pointer, a working register and the like, numeral 50 designates an ALU for data operation, numerals 48, 49 and 51 designate input/output latches DA, DB and DO of the ALU 50 respectively, numeral 52 designates an S code data register (SD) for storing data as the S code 17, numeral 53 designates a data register (DD) storing data on memory access performed in the E stage, and numerals 101 to 110 designate internal buses (S1 bus, S2 bus, DO bus, A bus, AO bus, DISP bus, PO bus, CA bus, AA bus and DD bus) for performing transfer of data and addresses respectively in interior. Numeral 54 designates a PC operation unit and numeral 55 designates an address calculation unit.

Figure 9:
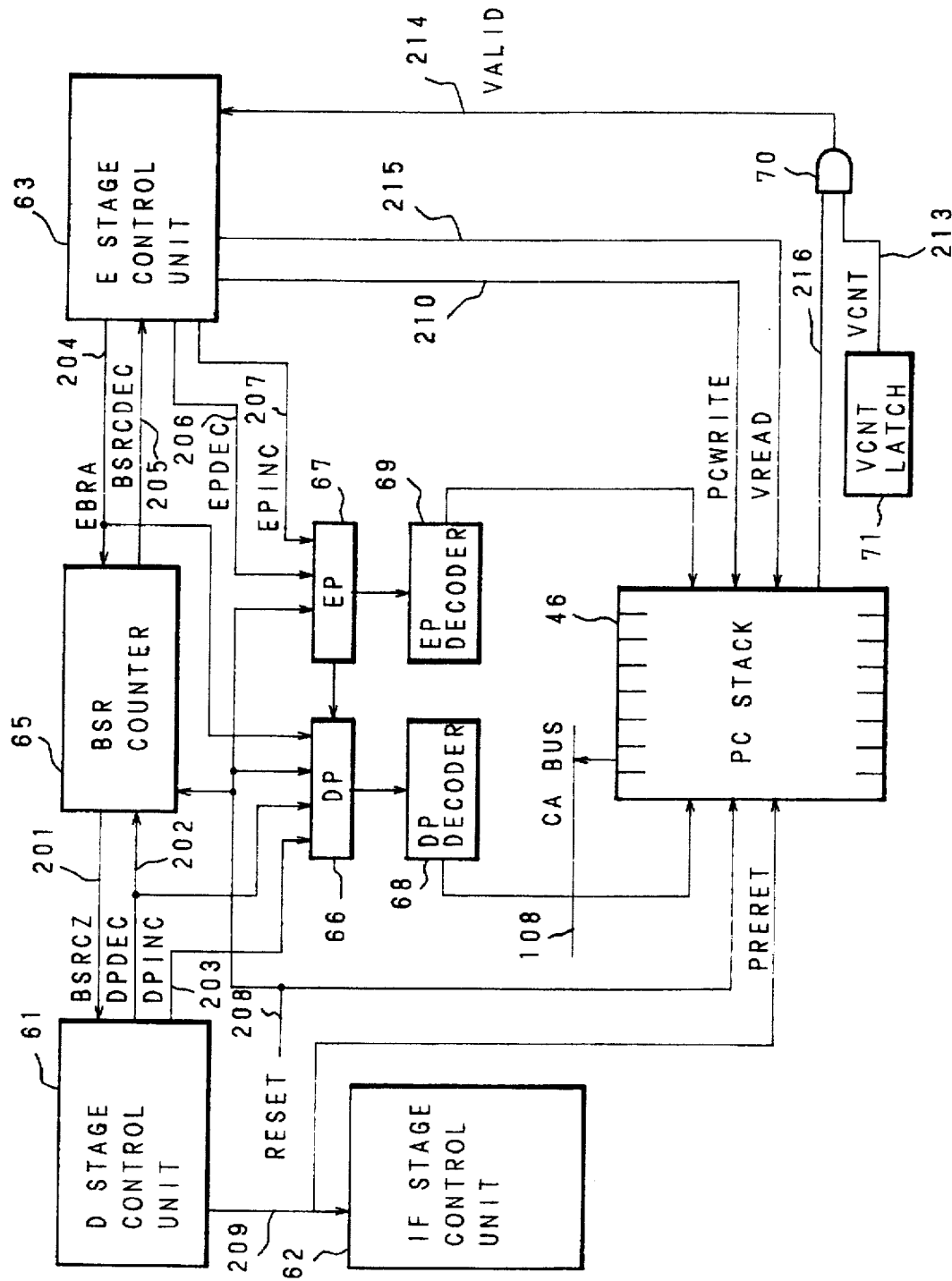
FIG. 9 is a block diagram showing a configuration of a data processor of another embodiment in accordance with the present invention.

FIG. 9 is a block diagram of portions relating particularly to pre-branch processing of the subroutine return instruction in the data processor of the second embodiment of the present invention.

In this figure, numeral 61 designates a D stage control unit, numeral 62 designates an IF stage control unit, numeral 63 designates an E stage control unit, numeral 65 designates a BSR counter which is a three-bit counter for counting the number of the subroutine call instruction on half way of the pipeline processing, numeral 66 designates a three-bit PC stack pointer (DP) controlled by the D stage 2, numeral 67 designates a three-bit PC stack pointer (EP) controlled by the E stage 5, numerals 68 and 69 designate decoders decoding the DP 66 and the EP 67 respectively, numeral 70 designates an AND gate, numeral 71 designates a valid bit control signal latch, and numerals 201 to 214 designates control signals of the respective unit. In this figure, a clock signal for controlling timing is omitted for simplification sake.

Figure 10:
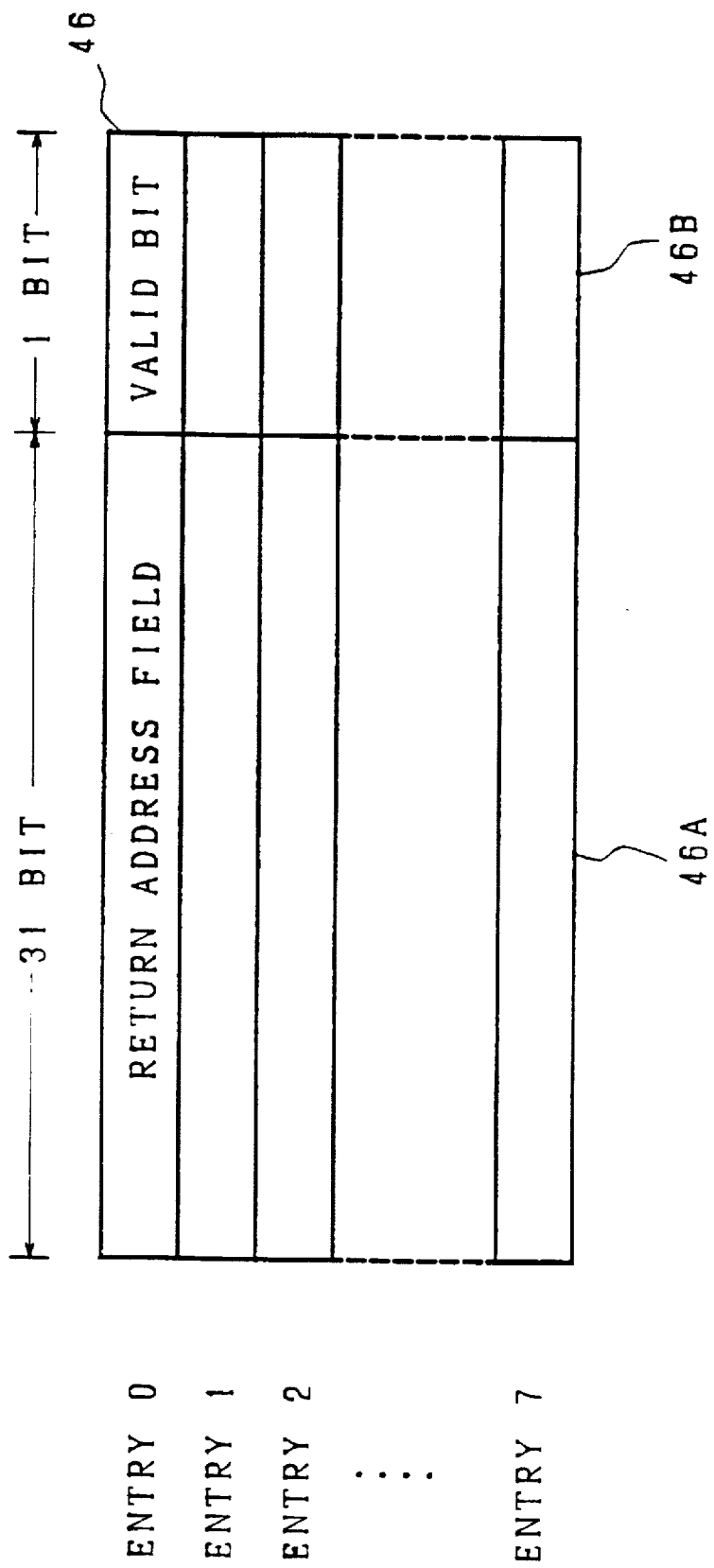
FIG. 10 is a schematic diagram showing a configuration of a PC stack of the same.

FIG. 10 is a diagram showing a configuration of the PC stack 46, wherein numeral 46A designates a return address field storing a return address, and numeral 46B designates a valid bit showing whether the return address stored in each entry is valid or not.

In this embodiment, the PC stack 46 is configured with eight entries. Also, an instruction code is formed by 16 bits, and therefore no odd address exists for the PC, and the return address field is formed with 31 bits. Where the return address is read-out from the PC stack 46, the least significant bit is outputted as '0'. The DP 66 and EP 67 are constituted with three bits, but carry from the most significant bit at increment and borrow to the most significant bit at decrement are neglected. This means that the PC stack 46 is handled as a ring-like stack memory wherein the entry pointed by '000' of the pointer and the entry pointed by '111' of the pointer adjoin each other.

(3.1.1) "Outline of Operation of PC Stack"

In the data processor of the second embodiment of the present invention, a branch subroutine (BSR) instruction and a jump subroutine (JSR) instruction are provided as a subroutine call instruction. Also, as a subroutine return instruction, a return subroutine instruction (RTS) and an EXITD instruction are provided. The EXITD instruction performs subroutine return for high level language and parameter release at a time as a high-function instruction.

When the subroutine call instruction is executed, the return address from the subroutine is pushed to the PC stack in the E stage 5. When the subroutine return instruction is decoded, pre-branch (pre-return) processing is performed to the address stored in the stack top of the PC stack 46 in the D stage 2.

In the E stage 5, whether or not in the pre-return processing in the D stage 2 has been correct is checked, and where the pre-return address has been wrong, branch processing to the true return address is performed.

Detailed description is made hereinafter including renewals of the pointers DP 66 and EP 66 and the like. Note that the value of the valid bit control signal latch 71 is set to '1'.

In the reset state, the BSR counter 65 and the EP 67 are cleared to '0' corresponding to an initialize signal (INIT signal) 208 of the PC stack 46, and the value of the EP 67 kept to '0' is copied into the DP 66. Also, all of the valid bits 46B in the PC stack are cleared to '0'.

First, an instruction code 11 fetched from the instruction queue 21 is decoded in the instruction decoding unit 22. As a result of decoding, where the fetched instruction is the subroutine call instruction, decrement of the DP is performed corresponding to a DPDEC signal 202, and the BSR counter 65 is counted up. In the address calculation stage 3, the return address is calculated by the address adder 38, being transferred to the FA register 41 through the AO bus 105.

In the F stage 4, the value of the FA register 41 is transferred to the SA register 42. When the subroutine call instruction is executed in the E stage 5, the value of the EP 67 is predecremented corresponding to an EPDEC signal 206. Then, the value of the return address stored in the SA register 42 is written-in to the return address field 46A of the entry pointed by the EP 67 which has been renewed corresponding to a PCWRITE signal 201 in the PC stack 46 through the S1 bus 101, and the valid bit 46B of that entry is set to '1'. Also, the BSR counter 65 is decremented corresponding to a BSRCDEC signal 205. In the BSR instruction, branch processing to the head address of the subroutine is performed in the D stage 2, and therefore no branch processing is required to be performed in the E stage 5.

Next, description is made on processing of the subroutine return instruction.

When an instruction fetched from the instruction queue 21 is the subroutine return instruction, a BSRCZ signal 201 indicating whether or not the value of the BSR counter 65 is zero is checked. If the value of the BSR counter 65 is not zero, the D stage 2 suspends processing until the value of the BSR counter 65 becomes zero. That the value of the BSR counter 65 is not zero shows that the corresponding subroutine call instruction is still remained in the pipeline without being executed in the E stage 5, and shows that the corresponding return address is not yet registered in the PC stack 46.

When the BSRCZ signal 201 indicates that the value of the BSR counter 65 is zero or has become zero, the D stage control unit 61 informs the IF stage control unit 62 and the PC stack 46 to perform pre-return processing corresponding to a PRERET signal 209. The PC stack 46 outputs the content of the return address field 46A of the entry pointed by the DP 66 to the CA bus 108. The IF stage control unit 62 disables all of instruction data fetched in the instruction queue 21, fetches the instruction of the return address according to the value outputted to the CA bus, and sends the fetched instruction data to the instruction decoding unit 22. After the content of the PC stack 46 has been outputted to the CA bus 108, the DP 66 is post-decremented corresponding to a DPING signal 203. The content of the valid bit 46B of the entry pointed by the EP 67 in the PC stack 46 is sent to the E stage control unit 63 as a VALID signal 214 corresponding to a VREAD signal 215. The valid bit 46B of the read-out entry is cleared to '0'. In the E stage control unit 63, if the VALID signal 214 is '1', it shows that the pre-return has been correct, and the execution of the subroutine return instruction is completed. If the VALID signal 214 is '0', it shows that the return address to which pre-return is executed has been wrong. In this case, the value of the true return address is fetched into the DD register 53 from a memory, and is transferred to the EB register 45 through the S1 bus 101, and thereafter the value of the EB register 45 is outputted to the CA bus 108. The IF stage 1 performed instruction fetching by the value outputted to the CA bus 108.

The valid bit 46B in the PC stack 46 is set to '1' when the return address at a subroutine call is registered, and is cleared to '0' after the valid bit 46B has been read-out at a subroutine return. This means that in the entry wherein the valid bit 46B is '1' in the PC stack, the correct return address is registered.

When the subroutine return instruction is executed, in the E stage 5, whether or not the return address having undergone pre-return has been correct is checked. This means that since the PC stack 46 is configured with eight entries, where a subroutine call becomes an input of nine or more levels, the data of the return address relating to the subroutine call of levels higher than eight levels is overwritten and destroyed. To prevent this destruction, in the E stage 5, whether or not the pre-return has been executed correctly is checked. When the PC stack 46 is read (subroutine return) by eight or more levels from the deepest level, all of the valid bits 46B in the PC stack 46 become '0', showing that no valid return, address is stored. However, on the subroutine call of eight levels from the deepest subroutine level, the correct value is stored all the time in the PC stack 46, and therefore the probability that pre-return is correctly performed is very high.

The before-mentioned BSR counter 65 is provided to perform a correct pre-return even immediately after the BSR instruction wherein pre-branch is performed, and reliably perform comparison in the E stage 5. During processing of the BSR instruction, if this function is not provided, where the subroutine return is executed in the D stage after processing has been completed in the D stage, but before the value of the return address is written to the PC stack 46 in the E stage 5, pre-return processing is performed to a wrong return address because the return address of the corresponding subroutine return instruction is not yet registered.

Furthermore, in the stage wherein the subroutine return instruction is processed in the E stage 5, the preceding BSR instruction has already been processed, and the correct return address is kept registered in the PC stack 46, and therefore the VALID signal 214 indicates '1' (valid) when the valid bit 46B is referred in the E stage 5, and the processing is carried out assuming that the pre-return has been correct. This means that a wrong operation is made in such a case. However, by providing the function of the BSR counter, the pre-return is performed after the value of the return address to be referred has been registered by the preceding BSR instruction.

Also, in executing the BSR instruction, the PC stack 46 is not rewritten after the PC stack 46 has been referred in the D stage 2 until it is processed in the E stage 5, and therefore the valid bit 46B corresponding to the entry in the PC stack 46 wherefrom the return address has been read in the D stage 2 is referred correctly in the E stage 5.

In the JSR instruction performing no pre-branch, the branch processing to the branch target address is performed in the E stage 5, and therefore, even if the RTS instruction performs pre-return by referring the PC stack 46 before register by execution of the JSR instruction, the pipeline processing is canceled before the RTS instruction itself is executed, and therefore such a wrong operation does not take place. The same is true of the case where no pre-branch processing is performed on the BSR instruction.

As described above, by installing the PC stack 46 storing only the return address at a subroutine call, the pre-return to the return address is performed for the subroutine return instruction in the decoding stage and thereby a disturbance of the pipeline in execution of the subroutine return instruction can be avoided.

Where a branching takes place in the E stage 5, the value of the BSR counter 65 is cleared to '0' corresponding to a EBRA signal 204, and the content of the EP 67 is copied into the DP 66. Where a branching takes place in the E stage 5, all of processings in the IF stage 1 through the F stage 4 are disabled, and therefore the subroutine call instruction on half way of processing which has been decoded in the D stage 2, but has not been executed in the E stage 5, renewals of the BSR counter 65 and the DP 66 performed for the subroutine return instruction are disabled, and the value of the return address of the PC stack 46 up to that level can be referred correctly in the D stage 2.

Where the return address from a subroutine in an external memory is rewritten by a program, the return address stored in the PC stack 46 and the return address in the external memory have different values, so that the operation is not assured. Accordingly, where pre-return processing is performed, re-write of the return address in the external memory by the program is inhibited.

The data processor of the second embodiment of the present invention has a means for forcedly disabling the pre-return processing by a program. This processing is performed by re-writing the content of the valid bit control signal latch (VCNT latch 71) in the control register by a program. By setting the VCNT latch 71 to '1', the VALID signal 214 indicating whether or not the return address having undergone the pre-return processing as described above has been correct reflects the value of the valid bit 46B in the PC stack 46, and is sent to the E stage control unit 63. By setting the VCNT latch 71 to '0', a VCNT signal 213 becomes 001, and the VALID signal 214 sent from the AND gate 70 to the E stage control unit 63 becomes '0' irrespective of the value of the valid bit 46B in the PC stack 46. Accordingly, the pre-return processing performed in the D stage 2 is disabled all the time, and the return address is read-out from the external memory in the E stage 5, and processing returns to that return address. Since all of the pre-return processings are disabled, an accurate operation is assured even if the value of the return address from the subroutine in the external memory is re-written.

Also, where '0' is set in the valid bit control signal latch (VCNT latch 71), and thereafter the pre-return processing is enabled again, initialization of the PC stack 46 is performed by setting the PC stack 46 initialize signal (INIT signal 208) in the control register to '1' by a program. The BSR counter 65 and the EP 67 are cleared to '0', and the value of the EP 67 set to zero is copied into the DP 66. Also, all of the valid bits 46B in the PC stack 46 are cleared to '0'. Thereafter, the pre-return processing is enabled again by setting the VCNT latch 71 to '1'.

(3.1.2) "Detailed Operations of Subroutine Call Instruction and Subroutine Return Instruction"

The above description has been made on outline of operations of the subroutine call instruction and the subroutine return instruction, and here description is made on detailed operations of the respective instructions.

In the data processor of the second embodiment of the present invention, the branch subroutine (BSR) instruction and the jump subroutine (JSR) instruction are provided as the subroutine call instructions. Also, as the subroutine return instructions, the return subroutine (RTS) instruction and the EXITD instruction performing subroutine return for high level language and parameter release at a time as a high-function instruction are provided. FIG. 5 which is described in above-mentioned embodiment shows bit allocation of each instruction. An operation code is shown by ' ___ '.

In the processings of the BSR instruction and the JSR instruction and the processings of the RTS instruction and the EXITD instruction, the processing relating to the PC stack 46 is the same, and therefore, hereinafter detailed description is made on the BSR instruction and the RTS instruction.

(3.1.2.1) "BSR Instruction"

The BSR instruction is a subroutine call instruction supporting only the PC-relative addressing, the return address thereof is made to save in the stack.

As shown in FIGS. 5(A) and 5(B), the BSR instruction has two instruction formats; the general format (G format) and the reduced format (D format). In the D stage 2, similar processing is performed in either of the formats. This instruction is processed as one step code.

Figure 11:
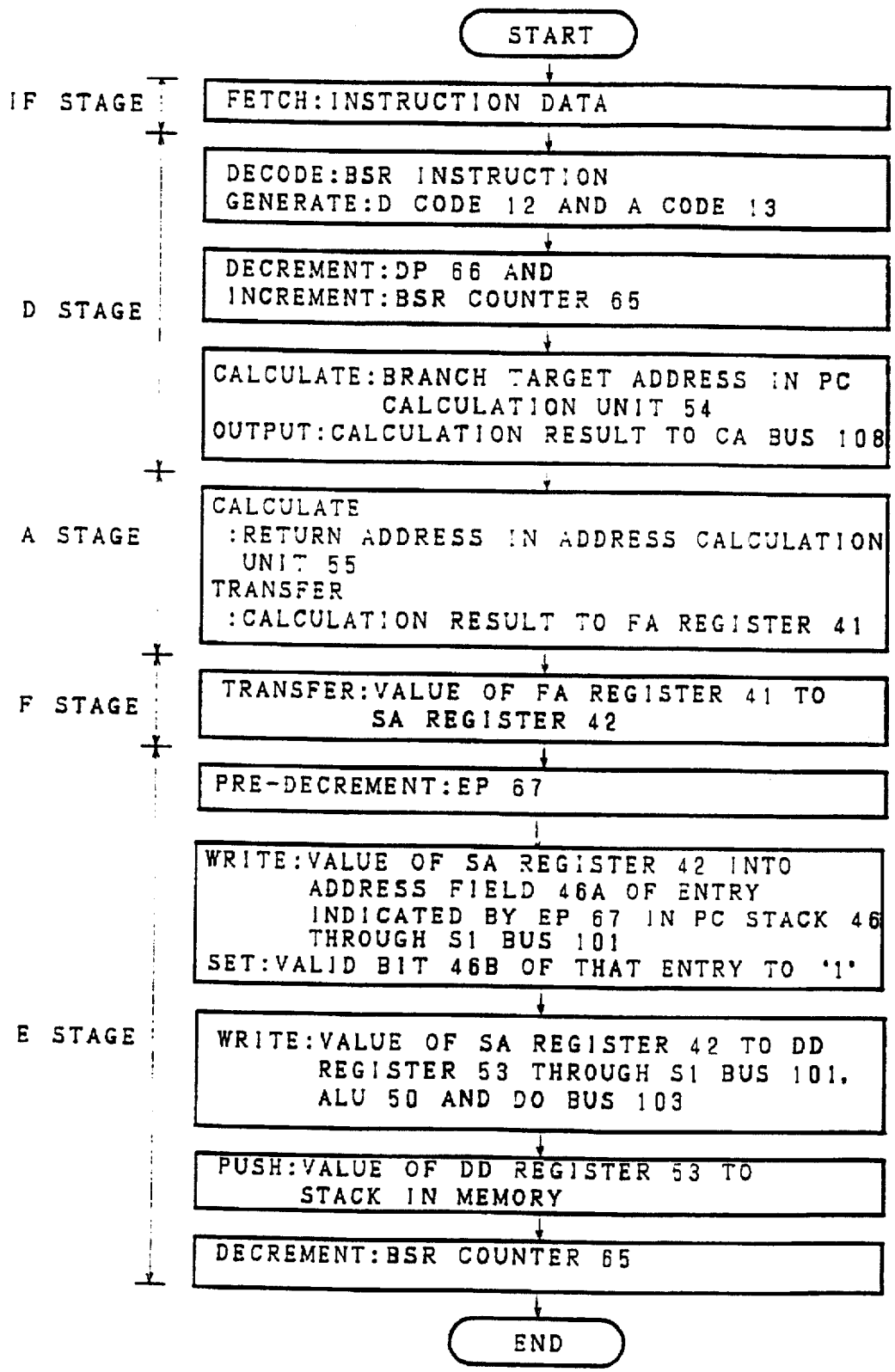
FIG. 11 is a flow chart showing processing procedures of a BSR instruction of another embodiment.

FIG. 11 shows a flow chart of execution of the BSR instruction.

When the BSR instruction is processed in the instruction decoding unit 22, a D code 12 indicating a step code of the BSR instruction and an A code 13 for calculating the return address are produced. In the case of the G format instruction, the value of a displacement 82D is also fetched simultaneously according to a field 82B indicating the size of displacement. Also, decrement of the DP 66 and increment processing of the BSR counter 65 are performed corresponding to the DPDEC signal 202. This instruction is an instruction performing pre-branching, calculation of jump target address is performed in the PC operation unit 54, and the result of the operation is outputted to the CA bus in order to perform pre-branch processing.

In the A stage 3, the return address is calculated in the address calculation unit 55 according to the indication of the A code 13, being transferred to the FA register 41 through the AO bus 105.

In the F stage 4, the value of the FA register 41 is transferred to the SA register 42.

In the E stage 5, first, pre-decrement of the EP 67 is performed corresponding to the EPDEC signal 206. Subsequently, the value of the SA register 42 storing the return address is written to the return address field 46A of the entry pointed by the EP 67 in the PC stack 46 through the S1 bus 101, and the valid bit 46B of that entry is set to '1'. At the same time, the value of the S1 bus 101 is written into the DD register 53 through the ALU 50 and the DO bus 103, and the value of the DD register 53 storing the return address is pushed to the stack in the memory controlled with software by the stack pointer. After registration of the return address in the PC stack 46, the BSR counter 65 is decremented corresponding to the BSRCDEC signal 205. In this instruction, the branch processing has already been performed in the D stage 2, and therefore no branch processing is performed in the E stage.

(3.1.2.2) "RTS Instruction"

The RTS instruction is an instruction for performing a return from the subroutine, and jumps to the return address restored from the stack. This instruction is processed as one step code.

Figure 12:
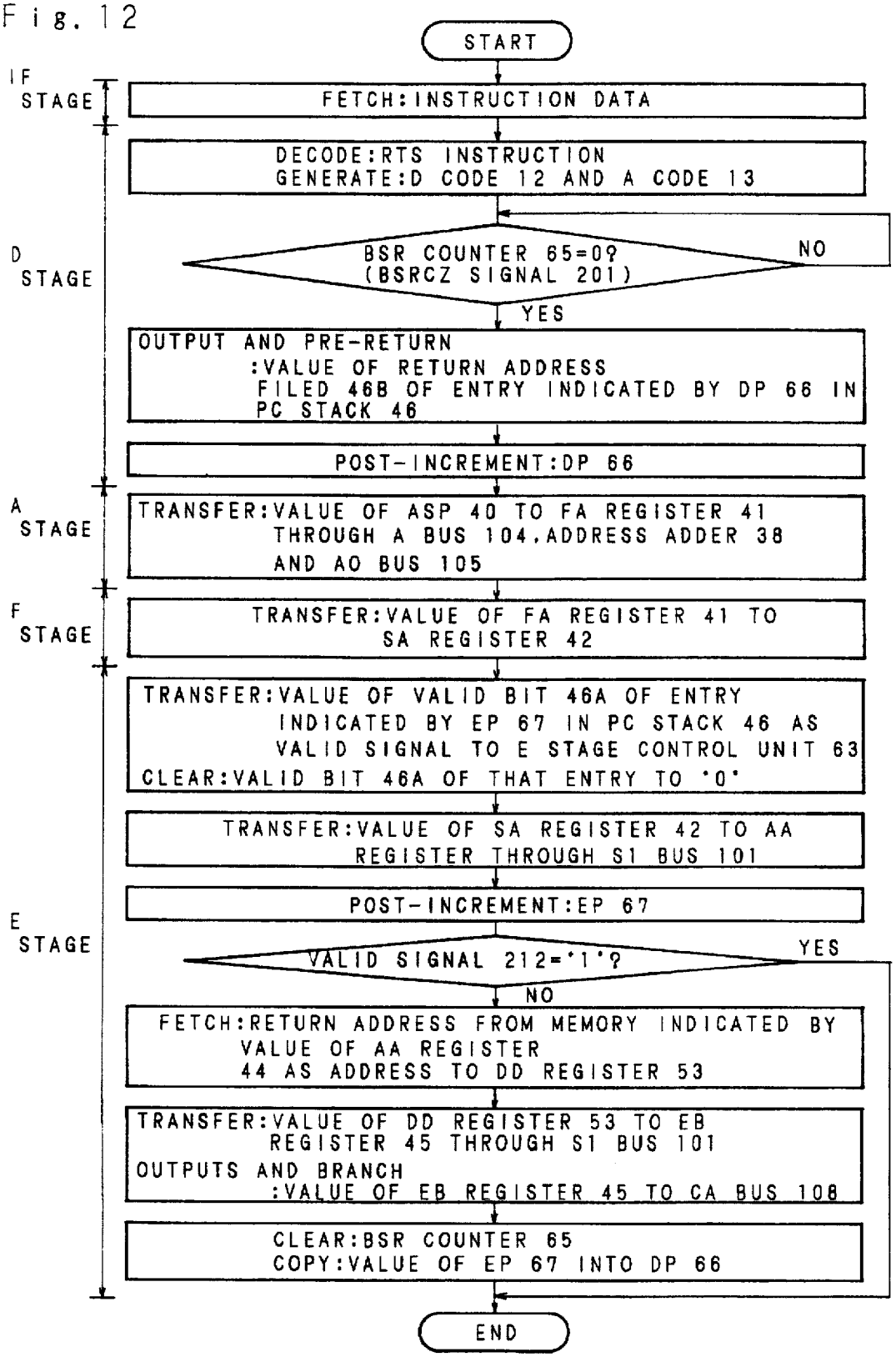
FIG. 12 is a flow chart showing processing procedures of an RTS instruction of another embodiment.

FIG. 12 shows a flow chart in execution of the RTS instruction.

When the RTS instruction is processed in the instruction decoding unit 22, the D code 12 indicating the step code of the RTS instruction and the A code 13 for calculating the address of the stack top are produced. This instruction is an instruction for performing a pre-return. Where presence of the subroutine call instruction in the pipeline is indicated corresponding to the BSRCZ signal 201, processing is suspended until the content of the BSR counter 65 becomes zero. Where the content of the BSR counter 65 is zero, pre-return processing is performed. The content of the return address field 46A of the entry pointed by the DP 66 in the PC stack 46 is outputted to the CA bus 108 corresponding to the PRERET signal 209, and pre-branch processing (pre-return) is performed. Also, after referring to the PC stack 46, post-increment processing is performed corresponding to the DPINC signal 203.

In the A stage 3, the stack top address is calculated in the address calculation unit 55 according to a indication of the A code 13, being written into the FA register 41 through the AO bus 105. The stack top address is just the value of the ASP 40.

In the F stage 4, the value of the FA register 40 is transferred to the SA register 42.

In the E stage 5, corresponding to the VREAD signal 215, the content of the valid bit 46B of the entry pointed by the EP 67 in the PC stack 46 storing the return address referred at pre-return is sent to the E stage control unit 63 as the VALID signal 214, and the value of the valid bit 46B of that entry is cleared to '0'. Also, at the same time, the value of the SA register 42 showing the stack top address is transferred to the AA register 44 through the S1 bus 101. After referring to the PC stack 46, post-increment of the EP 67 is performed corresponding to an EPINC signal 207.

If the VALID signal 214 is '1', it shows that the pre-return has been performed to the correct address, and the E stage 5 executes NOP (No Operation) for one micro cycle and completes the execution of the instruction.

Where the VALID signal 214 is '0', it shows that the return address whereto pre-return has been performed is wrong, and the value of the return address is fetched with the value of the AA register 45 taken as the address, being fetched into the DD register 53. The value of the DD register 53 is transferred to the EB register 45 through the S1 bus 101, and the value of the EB register 45 is outputted to the CA bus 108, and branch processing is performed. At this time, corresponding to the EBRA signal 204, the BSR counter 65 is cleared, and the value of the EP 67 is copied into the DP 66.

In this embodiment, the PC stack 46 is configurated with eight entries. Accordingly, when a subroutine call is a nest of nine or more levels, another return address is overwritten onto the entry storing the valid return address, and therefore the initial value is erased. Accordingly, except for the special case of performing a recursive call, a nest of nine or more levels results in a wrong pre-return. Re-write of the return address in an external memory by a program also results in a pre-return to a wrong return address. For this reason, whether or not the pre-return has been correct is required to be checked in the E stage. The number of entries of the PC stack to be installed has only to be determined by a compromise between the performance problem of the number of levels of depth of the subroutine call allowing a correct pre-return and the amount of increase in hardware.

In this embodiment, the BSR counter 65 is provided to perform a reliable pre-return, but where the pre-branch processing of the subroutine call instruction is not performed, pre-branch processing to the jump target address is performed without fail after the subroutine call has been executed, and the pipeline processing is canceled, and therefore this function is not necessary. Also, the pointer 66 is decremented when the BSR instruction is decoded in the D stage 2, but it is also possible that the value of the pointer EP 67 which is decremented when the BSR instruction is executed in the E stage 5 is copied.

Also, in this embodiment, whether or not the pre-return has been performed correctly is checked in the E stage 5, and therefore the valid bit 46B of the entry which is referred to the PC stack 46 at the pre-return, but it is also possible that the valid bit 46B is made to read-out at the same time when pre-return is executed in the D stage 2, and that value of the valid bit is transferred to the E stage 5.

In this case, the check may be performed in the E stage 5 likewise the above-described embodiment by using the transferred value of valid bit or the processing of the micro instruction may be changed in the R stage 4 by changing the entry address of the micro instruction using this value of valid bit. Note that, also in this case, switching processing of the pointer and clearing processing of the valid bit 46B are required to be performed.

Also, in this embodiment, when the subroutine return instruction is processed in the D stage 2, pre-return processing is performed without fail, but it is also possible that the valid bit 46B is also read simultaneously in performing pre-return in the D stage 2, and only when the value of that valid is '1' (valid), the pre-return processing is performed.

Also, in this embodiment, whether or not the pre-return has been correct is checked in the E stage 5, and thereafter the return address is fetched from the external memory only when the pre-return has been wrong, but the value of the return address may be read irrespective of the result of the check. For example, in the case of the RTS instruction, the value of the return address may be prefetched in the F stage 4.

Also, in the above-described embodiment, a counter is used as a means for detecting whether or not a stage after the D stage 2 is processing the subroutine call instruction, but it is also possible that a flag for subroutine call instruction is provided on every step code or on every pipeline stage, and pre-return processing is performed only when all the flags are not set.

Also, even if the BSR counter or the above-mentioned alternative flag function is removed to curtail software, a correct operation can be performed because whether or not the pre-return has been correct is checked in executing the subroutine return instruction. The deterioration in performance at this time depends upon the frequency of simultaneous fetching of the subroutine call instruction and the corresponding subroutine return instruction into the pipeline.

Also, in the above-described embodiment, two pointers of the pointer DP 66 controlled by the D stage 2 and the pointer EP 67 controlled by the E stage 5 are provided as pointers for the PC stack 46. This intends that the correct return address can be referred even when a plurality of subroutine instructions are processed in the pipeline. The EP 67 changes in correspondence to the subroutine call instruction and the subroutine return instruction which have been executed in the E stage 5. The DP 66 changes in the instruction decoding stage, and therefore, even if two or more subroutine return instructions are fetched into the pipeline, the return address of the corresponding subroutine call instruction can be referred. When branch processing is performed in the E stage 5, the pipeline processing is canceled, and therefore the value of the EP 67 is copied into the DP 66. It is allowed that only the EP 67 manages all pointers of the PC stack 46 and a flag for a subroutine return instruction is provided in order to set up it during executing a subroutine return instruction in the stages after the A stage 3, the flag is kept set, and when the flag is kept set, pre-return processing is made to wait, and thereby a reference to the PC stack 46 can be performed after the pointer has been changed-over correctly, and therefore a correct pre-return can be performed.

Also, the PC stack 46 of the second embodiment of the present invention works efficiently if it is accessed also at pre-return and also when whether or not the pre-return has been performed correctly is judged, and is accessed independent of access to a memory outside the CPU. For this purpose, in a data processor such as a microprocessor wherein the CPU can be realized by one IC chip, the PC stack 46 is comprised in the same IC, and thereby the PC stack 46 can be accessed independent of access to a memory outside the CPU.

As described above, in accordance with the second embodiment of the present invention, by providing the PC stack storing only the return address of the subroutine call instruction, branch processing of the subroutine return instruction can be performed before processing in the instruction execution stage, and thereby the overhead of the pipeline processing due to execution of the subroutine return instruction can be curtailed, and therefore the second embodiment of the present invention provides an effect of obtaining a high-performance data processor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor comprising:

a first storage means for storing instructions, operand data, and subroutine return addresses when a subroutine call instruction is executed;

a second storage means for storing at least in part of a copy of said subroutine return address stored in said first storage means when said subroutine call instruction is executed;

a first address counter, coupled to a first address input of said second storage means, which is at least incrementable or decrementable, and points to one of a plurality of entries in said second storage means;

a second address counter, coupled to a second address input of said second storage means, which is incrementable and decrementable, and points to one of said plurality of entries in said second storage means, and wherein contents of said second address counter are independently adjustable relative to contents of said first address counter;

a first reading means, coupled to said first address counter and said second storage means, for reading a value from an entry of said second storage means indicated by the value of said first address counter;

a second reading means, coupled to said second address counter and said second storage means, for reading a value from an entry of said second storage means indicated by the value of said second address counter;

a first writing means, coupled to said second address counter and said second storage means, for writing said at least a part of a copy of said subroutine return address into an entry of said second storage means which is indicated by the value of said second address counter;

a second writing means, coupled to said first address counter and said second address counter, for writing in a value of said second address counter to said first address counter when activated by a second writing means control signal; and a third writing means, coupled to said first storage means, for writing said operand data and said subroutine return addresses to said first storage means.

2. A data processor as set forth in claim 1, wherein said second storage means, said first address counter, said second address counter, said first reading means, said second reading means, said second writing means, said first writing means, and said second writing means are provided on a single chip on which a central processing unit is also provided.

3. A data processor as set forth in claim 1, further comprising:

a judging means for judging whether said value from said entry of said second storage means indicated by said value of said second address counter accurately represents said subroutine return address in said first storage means.

* * * * *

UNITED STATES PATENT AND TRADEMARK OFFICE
CERTIFICATE OF CORRECTION

PATENT NO. : 5,701,449
DATED : December 23, 1997
INVENTOR(S) : MASAHITO MATSUO et al.

It is certified that error appears in the above-identified patent and that said Letters Patent is hereby corrected as shown below:

Column 25, line 12, before "said first writing", add --"and"--.
Column 26, line 1, before "are", delete ", and said second writing means".

Signed and Sealed this

Twenty-seventh Day of April, 1999

Attest:

Q. TODD DICKINSON

Attesting Officer

Acting Commissioner of Patents and Trademarks